United States Patent
Giblin et al.

(10) Patent No.: US 12,101,402 B2
(45) Date of Patent: Sep. 24, 2024

(54) KEY ROTATION ON A PUBLISH-SUBSCRIBE SYSTEM

(71) Applicant: International Business Machines Corporation, Armonk, NY (US)

(72) Inventors: Christopher J. Giblin, Zurich (CH); John G. Rooney, Zurich (CH); Florian Hermann Froese, Zurich (CH); Pascal Vetsch, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 283 days.

(21) Appl. No.: 17/121,170

(22) Filed: Dec. 14, 2020

(65) Prior Publication Data

US 2022/0191018 A1   Jun. 16, 2022

(51) Int. Cl.
  *H04L 9/08*  (2006.01)
(52) U.S. Cl.
  CPC .......... *H04L 9/0891* (2013.01); *H04L 9/0861* (2013.01)
(58) Field of Classification Search
  CPC .... H04L 9/0891; H04L 9/0861; H04L 9/0894
  See application file for complete search history.

(56) References Cited

U.S. PATENT DOCUMENTS

| | | | |
|---|---|---|---|
| 9,049,023 B2 * | 6/2015 | Green | H04L 9/088 |
| 9,659,190 B1 * | 5/2017 | Perlman | G06F 21/6218 |
| 10,623,186 B1 * | 4/2020 | Mehr | H04L 9/3226 |
| 2012/0321078 A1 * | 12/2012 | Chambers | G06F 21/00 380/44 |
| 2015/0271153 A1 * | 9/2015 | Rohloff | H04L 63/0471 713/153 |
| 2016/0330209 A1 | 11/2016 | Iacob | |
| 2018/0254892 A1 * | 9/2018 | Egorov | H04L 9/0891 |
| 2019/0173674 A1 | 6/2019 | Agarwal | |
| 2020/0119917 A1 | 4/2020 | Christensen | |
| 2021/0036851 A1 * | 2/2021 | Villapakkam | G06F 21/602 |

FOREIGN PATENT DOCUMENTS

| | | |
|---|---|---|
| CN | 102262721 A | 2/2016 |
| CN | 109587178 A | 4/2019 |

(Continued)

OTHER PUBLICATIONS

"Gossip Protocol," Serf by HashiCorp, accessed Dec. 9, 2020, 4 pages. <https://www.serf.io/docs/internals/gossip.html>.

(Continued)

*Primary Examiner* — Ali S Abyaneh
*Assistant Examiner* — Lydia L Noel
(74) *Attorney, Agent, or Firm* — Eric W. Chesley

(57) ABSTRACT

The present disclosure relates to a method for a cryptographic key rotation in a publish-subscribe system providing a broker service for routing stored encrypted messages to one or more subscribers of the topic to which the routed messages are assigned. The routing comprises decrypting the stored encrypted messages. The cryptographic key rotation comprises a re-encryption of the stored messages using a cryptographic replacement key. The re-encryption is executed by an encryption module of the publish-subscribe system as a background process, while the broker service is continued.

19 Claims, 18 Drawing Sheets

(56) References Cited

FOREIGN PATENT DOCUMENTS

CN       110708247 A     1/2020
WO     2018208786 A1   11/2018

OTHER PUBLICATIONS

"IBM MQ (formerly IBM WebSphere MQ)," IBM, accessed Dec. 9, 2020, 4 pages. <https://www.ibm.com/support/knowledgecenter/SSFKSJ/com.ibm.mq.helphome.doc/product_welcome_wmq.htm>.

"Rotate the master key/secret," Cloudera Docs, accessed Dec. 9, 2020, 2 pages. <https://docs.cloudera.com/runtime/7.2.0/kafka-securing/topics/kafka-secure-deltokens-rotate-secret.html>.

Kreps et al., "Kafka: a Distributed Messaging System for Log Processing," NetDB'11, Jun. 12, 2011, 7 pages.

Mell et al., "The NIST Definition of Cloud Computing," Recommendations of the National Institute of Standards and Technology, U.S. Department of Commerce, Special Publication 800-145, Sep. 2011, 7 pages.

International Search Report and Written Opinion, dated Mar. 9, 2022, PCT/IB2021/061161.

* cited by examiner

KEY ROTATION ON A PUBLISH-SUBSCRIBE SYSTEM

BACKGROUND

The present disclosure relates to the field of publish-subscribe systems and, more specifically, to a method, a computer program product, and a computer system for a cryptographic key rotation in a publish-subscribe system.

Distributed data streaming systems such as publish-subscribe systems play an increasing role in the distribution of data, e.g., within enterprises and other types of organizations. A publish-subscribe system allows messages, provided by publishers, to be broadcast to different parts of a system, i.e., subscribers, asynchronously. Messages published to a topic are broadcasted to the subscribers of the respective topic. In order to protect messages stored in the publish-subscribe system, the stored messages may be encrypted.

SUMMARY

According to an embodiment of the present disclosure, a method for a cryptographic key rotation in a publish-subscribe system is provided. The publish-subscribe system stores a plurality of messages, each of the stored messages is assigned to a topic from a group of topics, and each of the stored messages is assigned with a cryptographic key of a group of one or more cryptographic keys and being encrypted with the assigned cryptographic key. The publish-subscribe system provides a broker service for routing the stored messages to one or more subscribers of the topics to which the routed messages are assigned. The routing comprises decrypting the message to be routed using the assigned cryptographic key of the respective message and sending the decrypted messages to one or more of the subscribers of the assigned topic.

The cryptographic key rotation comprises a re-encryption of each message of a first set of one or more first messages of the stored messages. Each of the first messages is assigned to a common first topic from the group of topics, assigned to a first cryptographic key of a first set of one or more first cryptographic keys of the group of cryptographic keys, and encrypted with the assigned first cryptographic key. The re-encryption is executed by an encryption module of the publish-subscribe system as a background process, while continuing routing first messages from and receiving additional first messages for the common first topic by the broker service.

The re-encryption comprises adding a second set of one or more second cryptographic keys to the group of cryptographic keys. Each of the second cryptographic keys is a replacement key for one of the first cryptographic keys. The method further comprises for each of the first messages decrypting the encrypted first message using the first cryptographic key assigned to the respective first messages. The decrypted first message is re-encrypted using the replacement key for the assigned first cryptographic key. The replacement key used to re-encrypt the re-encrypted first message is assigned to the respective re-encrypted first message. A switching from using the encrypted first message and the assigned first cryptographic key for the routing to using the re-encrypted first message and the assigned replacement key is performed.

According to a further embodiment of the present disclosure, a computer program product for a cryptographic key rotation in a publish-subscribe system is provided. The computer program product comprises a computer readable storage medium having program instructions embodied therewith. The program instructions are executable by a processor of a computer system of a publish-subscribe system to cause the computer system to perform the cryptographic key rotation.

The publish-subscribe system stores a plurality of messages, each of the stored messages is assigned to a topic from a group of topics, and each of the stored messages is assigned with a cryptographic key of a group of one or more cryptographic keys and being encrypted with the assigned cryptographic key. The publish-subscribe system provides a broker service for routing the stored messages to one or more subscribers of the topics to which the routed messages are assigned. The routing comprises decrypting the message to be routed using the assigned cryptographic key of the respective message and sending the decrypted messages to one or more of the subscribers of the assigned topic.

The cryptographic key rotation comprises a re-encryption of each message of a first set of one or more first messages of the stored messages. Each of the first messages is assigned to a common first topic from the group of topics, assigned to a first cryptographic key of a first set of one or more first cryptographic keys of the group of cryptographic keys, and encrypted with the assigned first cryptographic key. The re-encryption is executed by an encryption module of the publish-subscribe system as a background process, while continuing routing first messages from and receiving additional first messages for the common first topic by the broker service.

The re-encryption comprises adding a second set of one or more second cryptographic keys to the group of cryptographic keys. Each of the second cryptographic keys is a replacement key for one of the first cryptographic keys. The method further comprises for each of the first messages decrypting the encrypted first message using the first cryptographic key assigned to the respective first messages. The decrypted first message is re-encrypted using the replacement key for the assigned first cryptographic key. The replacement key used to re-encrypt the re-encrypted first message is assigned to the respective re-encrypted first message. A switching from using the encrypted first message and the assigned first cryptographic key for the routing to using the re-encrypted first message and the assigned replacement key is performed.

According to a further embodiment of the present disclosure, a computer system for a cryptographic key rotation in a publish-subscribe system is provided. The publish-subscribe system stores a plurality of messages, each of the stored messages is assigned to a topic from a group of topics, and each of the stored messages is assigned with a cryptographic key of a group of one or more cryptographic keys and being encrypted with the assigned cryptographic key. The publish-subscribe system provides a broker service for routing the stored messages to one or more subscribers of the topics to which the routed messages are assigned. The routing comprises decrypting the message to be routed using the assigned cryptographic key of the respective message and sending the decrypted messages to one or more of the subscribers of the assigned topic.

The cryptographic key rotation comprises a re-encryption of each message of a first set of one or more first messages of the stored messages. Each of the first messages is assigned to a common first topic from the group of topics, assigned to a first cryptographic key of a first set of one or more first cryptographic keys of the group of cryptographic keys, and encrypted with the assigned first cryptographic key. The re-encryption is executed by an encryption module of the publish-subscribe system as a background process, while continuing routing first messages from and receiving additional first messages for the common first topic by the broker service.

The computer system comprises a processor and a memory storing program instructions executable by the processor. Execution of the program instructions by the processor causes the computer system to perform the re-encryption. The re-encryption comprises adding a second set of one or more second cryptographic keys to the group of cryptographic keys. Each of the second cryptographic keys is a replacement key for one of the first cryptographic keys. The method further comprises for each of the first messages decrypting the encrypted first message using the first cryptographic key assigned to the respective first messages. The decrypted first message is re-encrypted using the replacement key for the assigned first cryptographic key. The replacement key used to re-encrypt the re-encrypted first message is assigned to the respective re-encrypted first message. A switching from using the encrypted first message and the assigned first cryptographic key for the routing to using the re-encrypted first message and the assigned replacement key is performed.

BRIEF DESCRIPTION OF THE DRAWINGS

In the following, embodiments of the disclosure are explained in greater detail, by way of example only, mak$_1$ng reference to the drawings in which.

DETAILED DESCRIPTION

Figure 1:
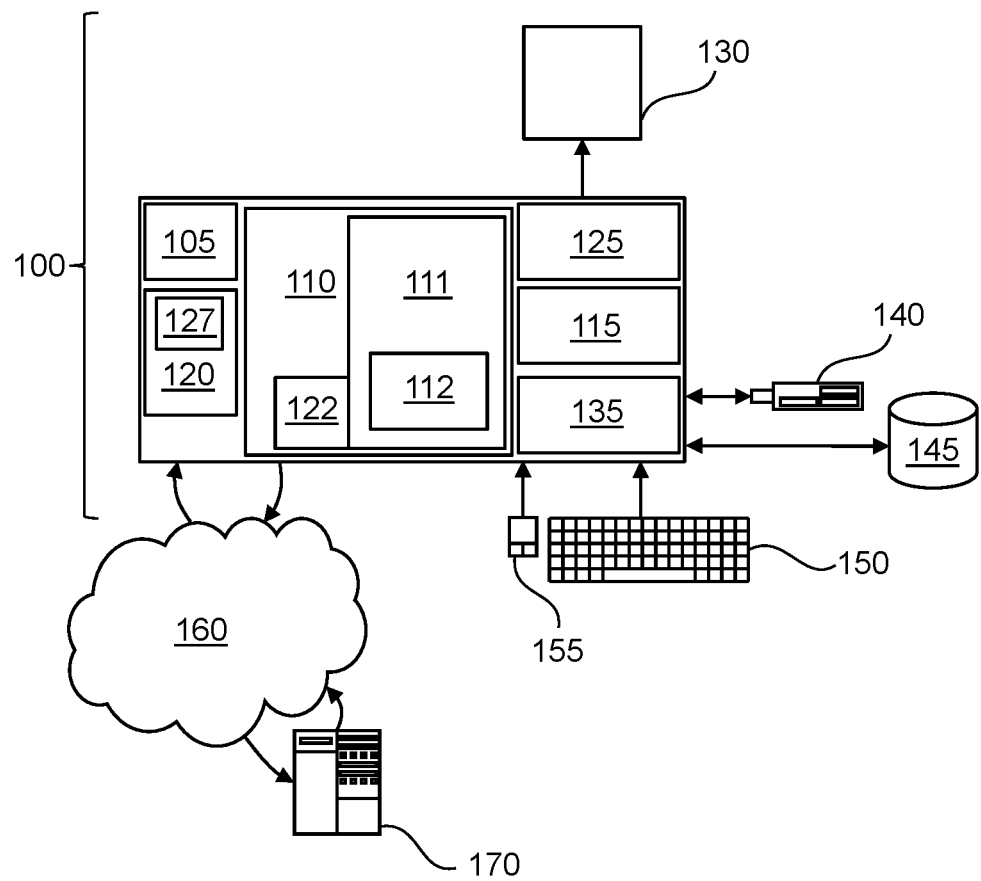
FIG. 1 depicts a schematic diagram illustrating an exemplary computer system.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The messages of the plurality of messages stored by the publish-subscribe system may be ordered messages, e.g., time ordered messages. The switching from using the encrypted first message and the assigned first cryptographic key for the routing to using the re-encrypted first message and the assigned replacement key may be performed automatically such that service to brokers and/or clients is not interrupted and does not require re-configuration of the brokers and/or clients.

Embodiments may implement a temporal continuity of an encrypted data stream provided by the publish-subscribe system during key rotation. Embodiments may allow data producers/consumer, i.e., publishers/subscribers, to write/read to the encrypted data stream without interruption during key rotation, i.e., while the encryption/decryption keys are being updated. Thus, a key rotation may be implemented without interruption of service in a distributed data streaming system in form of a publish-subscribe system.

A publish-subscribe system is a system implementing a publish-subscribe messaging pattern in which senders of messages, referred to as publishers or producers, instead of sending the messages directly to any receivers, referred to as subscribes or consumers, rather categorize messages to be published into categories, referred to as topics. The subscribers subscribe to one or more of the topics and only receive messages of topics they have subscribed. Thus, the publishers may, e.g., be without knowledge of which subscribers, if any, there may be, while at the same time the subscribers may, e.g., be without knowledge of which publishers, if any, there may be. Both publisher and subscriber may only refer to the topics, when sending requests to publish-subscribe system. The publish-subscribe messaging pattern may have the beneficial effect of enabling network scalability and dynamic network topologies.

In a publish-subscribe system, a subscriber may receive only a subset of the total amount of messages published. The process of selecting published messages for reception and processing is referred to as filtering. The filtering may, e.g., be topic-based. In a topic-based publish-subscribe system, messages are published to topics. A subscriber in a topic-based system may receive all messages published to the topics to which he subscribes. For example, a publisher may be responsible for defining the topics to which subscribers can subscribe.

In a publish-subscribe system, publishers may, e.g., post messages to an intermediary message broker, while subscribers register subscriptions with the broker, letting the broker perform the filtering. The broker may perform a store and forward function to route messages received from publishers to subscribers. Furthermore, the broker may, e.g., prioritize messages in a queue before routing. Subscribers may register for specific messages, e.g., at build time, initialization time or runtime. For example, in GUI systems, subscribers may be coded to handle user commands, like a click of a button, which may correspond to build time registration. For example, XML configuration files may be used to register subscribers. These configuration files may be read at initialization time. For example, subscribers may be added or removed at runtime. Such a registering at runtime may, e.g., be used, e.g., in database triggers, mailing lists, or RSS ("Really Simple Syndication" or "Rich Site Summary").

An advantage of publish-subscribe systems may be a loose coupling between publishers and subscribes. Publishers may not even need to know of the subscribers' existence. With, e.g., topics being the focus, publishers and subscribers may be allowed to remain ignorant of system topology. Publishers and subscribers may operate independently of each other. A publish-subscribe system may decouple not only the locations of the publishers and subscribers, but may also decouple the publishers and subscribers temporally. A subscriber may subscribe a topic for the first time and receive messages of the topic already published earlier.

A further advantage of publish-subscribe systems may be their scalability. The scalability may, e.g., be improved through parallel operation, message caching, tree-based or network-based routing, etc. A publish-subscribe system may, e.g., provide Internet-wide distributed messaging through web syndication protocols.

Server nodes, typically referred to as message brokers, serve as intermediary hubs, writing received data to storage and forwarding this data to clients upon request. As is common among publish-subscribe systems, data is organized into categories called topics. Message brokers support the so-called streaming paradigm whereby data arrives at any time, at any topic, and data flows are continuous for a bounded or unbounded duration. Clients of a broker subscribe to one or more topics and receive data as a stream.

The data of a topic may be stored in one or more topic partitions distributed across a cluster of brokers. Each topic partition may be an ordered sequence of messages. The totality of the data in the topic is the union of these partitions. A publish-subscribe system may support a strict order within a partition, but not between partitions. Partitions may be replicated in order to support fault tolerance. A publisher-subscribe system may maintain the following information about a topic: a set of active partitions of the topic and the lead broker, i.e., leader, handling them; an offset within the partition of the oldest and newest message; a last read offset for each partition for each consumer group; and a broker handling the replicas of a partition.

A consumer may connect to a bootstrap broker, gets the locations of the partitions of the topic it wishes to consume from and the offset of the last message read from that partition by the consumer group to which it belongs. It then requests the next offset from each of these partitions. If a broker becomes unavailable, they may organize themselves to nominate leaders for all the partitions which have become unavailable. The follower chosen to become leader should have an In-Sync Replica (ISR) for that partition. Followers get messages from the leader by consuming from the leader just like a normal consumer.

The clients may then switch their connections to these new leaders. Producers do something similar, but do not have to worry about the latest offset. In summary, a publish-subscribe system may be designed to scale to very high loads via the concept of distributed partitions and to handle failure seamlessly via the concept of replicated partitions.

Regulations and security best practice may call for key rotation, which typically entails re-encrypting data with a new key, either periodically as a risk-reduction measure or as a response to the exposure of an active encryption key. Key rotation poses a challenge for publish-subscribe messaging systems due to their continuously "live" nature. Rotating a key requires, in principle, that the system be suspended during re-encryption and resumed only upon completion of the re-encryption process. Yet messaging systems must be continuously available in order to receive and serve data without interruption. This disclosure describes different methods by which a messaging system may be enabled to rotate keys without interruption to its service.

According to embodiments, the publish-subscribe system may comprise a message broker which stores topic messages in encrypted form. This may be accomplished by encrypting incoming data, i.e., messages, and decrypting the same data when responding to client requests.

Encryption and decryption of messages may be performed by an encryption module of the broker or of a proxy of the publish-subscribe system. The encryption module has access to topic encryption keys and may be configured to send and/or receive notifications regarding key rotation events.

For example, a key rotation with re-encryption may be enabled in a publish-subscribe system using a topic alias. A topic alias directs requests to and from another topic. From the perspective of a client, a topic alias appears and behaves like a normal topic. The key rotation process may take advantage of the alias, creating a new, re-encrypted copy of a topic log of the topic to which the topic alias currently directs requests. The new, re-encrypted copy of a topic log is created as a new topic in the background. Once this re-encryption process completes, the topic alias is redirected to the new, re-encrypted topic. The previous topic logs may be safely deleted or archived. For clients of the alia topic, nothing has changed: the topic name, i.e., the alias, remains the same, connections remain intact, and service continues without interruption. For example, a key rotation with re-encryption may be implemented in a publish-subscribe system as an internal broker service. An internal topic management services may, e.g., be extended to include a new re-encryption service. Such a re-encryption service may progressively replace stored messages with re-encrypted versions of the respective messages in the background. For large topic logs, the re-encryption process may be optimized using parallelization. A lead broker of the public-subscribe system may coordinate other brokers in the cluster to share the re-encryption workload, thereby parallelizing the computation.

According to an embodiment, the cryptographic keys used for encrypting and decrypting messages within the publish-subscribe system may be symmetric cryptographic keys.

According to an embodiment, the encryption module is comprised by a broker of the publish-subscribe system.

Embodiments may have the beneficial effect that the re-encryption of the key rotation may be executed by the broker.

According to an embodiment, the encryption module is comprised by a proxy of the publish-subscribe system, via which the broker of the publish-subscribe system communicates with clients of the publish-subscribe system. Embodiments may have the beneficial effect that the re-encryption of the key rotation may be executed by the proxy. Thus, only the proxy may have to be adjusted to execute the re-encryption, while no brokers of the publish-subscribe system may have to be adjusted for executing the re-encryption.

Both message decryption and the re-encryption process may require means of knowing which key encrypted a given message. Means of doing may comprise an index mapping message IDs to keys or key IDs. An alternative strategy may comprise a storing of the encryption keys, in an encrypted form, along with the encrypted messages. The encryption keys may be encrypted or "wrapped" with a different key in a technique known as envelope encryption. During decryption, the encryption module may request an encryption key to be unwrapped and use the unwrapped encryption key to decrypt a message. Because the encryption key is always stored with the message, there may be no need for maintaining indices which greatly simplifies the implementation.

An embodiment may use a key management service (KMS) to support the wrap and unwrap operations. The KMS is assumed to store the wrapping key in a highly secure fashion such that it never leaves the KMS. In a publish-subscribe setting the encryption module may store the wrapped key into a message header when a message is encrypted, removing the header during message decryption prior to responding to client requests.

According to an embodiment, the encrypted messages stored in the publish-subscribe system each are provided with a header identifying the assigned cryptographic key of the group of cryptographic keys. Embodiments may have the beneficial effect that the encrypted messages themselves may identify the cryptographic key to be used to decrypt the respective messages.

According to an embodiment, the header identifying the assigned cryptographic key is removed during the routing prior to sending the routed decrypted message to the subscriber. Embodiments may have the beneficial effect of preventing information regarding the encryption and/or decryption of the messages stored in the publish-subscribe system to be shared with clients, like subscribers.

According to an embodiment, the headers of the encrypted messages each comprise the identified cryptographic key in an encrypted form using an envelope encryption with an envelope encryption key. The decryption of each of the encrypted first messages further comprises decrypting the assigned first cryptographic key provided by the header of the respective first message using the envelope encryption key. The re-encryption of each of the decrypted first messages further comprises encrypting the assigned replacement key used to re-encrypt the respective re-encrypted first message with the envelope encryption key and replacing the encrypted first cryptographic key in the header of the respective re-encrypted first message with the encrypted replacement key.

Embodiments may have the beneficial effect that the encrypted messages themselves may provide the cryptographic key to be used to decrypt the respective messages.

According to an embodiment, the publish-subscribe system comprises an index identifying for each the stored messages the assigned cryptographic key of the group of cryptographic keys. Embodiments may have the beneficial effect that the index may identify for each of the stored messages the cryptographic key to be used to decrypt the respective message. For example, the index may, e.g., identify individual messages or the index may, e.g., identify topic segment files, in which messages are stored. For example, the index may comprise identifiers of the stored messages which each are assigned with an identifier of the cryptographic key to be used to decrypt the respective message. For example, the index may comprise identifiers of the stored messages which each are assigned with the cryptographic key to be used to decrypt the respective message.

According to an embodiment, the re-encryption further comprises for each of the first messages identifying the first cryptographic key assigned to the respective first messages using the index and assigning in the index the replacement key for the identified first cryptographic key to the re-encrypted first message. For example, the index may identify the re-encrypted first messages encrypted using the replacement cryptographic keys in addition to the original first messages encrypted using the first cryptographic keys. In this case, identifiers of the re-encrypted first messages may be added to the index in addition to the identifiers of the original first messages and the identifiers of the re-encrypted first messages may be assigned with identifiers of the replacement keys to be used to decrypt re-encrypted first messages. For example, the identifiers of the re-encrypted first messages may be assigned with replacement keys to be used to decrypt re-encrypted first messages. For example, the original first messages may be replaced in the index by the re-encrypted first messages. In this case, identifiers of the original first messages may be replaced by identifiers of the re-encrypted first messages and the identifiers of the first cryptographic keys may be replaced by identifiers of the replacement keys to be used to decrypt re-encrypted first messages. For example, first cryptographic keys comprised by the index may be replaced by the replacement keys to be used to decrypt re-encrypted first messages.

In the following different techniques for re-encrypting topic data without service interruption to the broker are provided.

A first technique introduces the notion of a topic alias which directs requests to and from another topic. A topic alias appears and behaves like a normal topic from the perspective of a client. A key rotation process takes advantage of the alias, creating a new, re-encrypted copy of the topic logs in the background. Once this re-encryption process completes, the topic alias is redirected to the new, re-encrypted topic. The previous topic logs may be safely deleted or archived. For clients of the topic, nothing has changed; the topic name (i.e., the alias) is the same, connections remain intact, and service continues without interruption.

Embodiments may have several beneficial effects: For clients of a topic, i.e., producers and consumers, the topic may behave the same as a traditional topic. It may remain a label to which requests may be directed. No special awareness of topic aliases or any type of changes may be required by clients. Clients may be oblivious to the re-encryption process. Re-encrypted data may preserve all metadata such as timestamps, headers, etc. An uninterrupted publish-subscribe service may be provided to the clients. A technique comprising an alias implemented in a proxy may implement a re-encryption without changes to the broker.

According to an embodiment each of the stored messages is stored as a member of the topic to which the respective message is assigned. The method further comprises providing a first topic alias pointing to the common first topic from the first set of messages. The one or more subscribers of the common first topic subscribe the first topic alias. An additional common second topic is added to the group of topics and the re-encrypted first messages are stored as members of the common second topic. The switching comprises re-assigning the first topic alias to the common second topic such that the one or more subscriber subscribing to the first topic alias become subscribers of the common second topic.

Embodiments may have the beneficial effect that a topic alias may be used to implement the re-encryption. The switching from the encrypted first messages to the re-encrypted first messages may be implemented by a re-assigning of the topic alias. As long as the topic alias is assigned to the common first topic, the broker service is continuously provided using the encrypted first messages. Upon re-assigning of the topic alias to the common second topic, the broker service is continued using the encrypted first messages.

According to an embodiment, the switching further comprises deleting the common first topic with the first encrypted messages. Embodiments may have the beneficial effect of saving storage space. According to an alternative embodiment, the switching further comprises archiving the common first topic with the first encrypted messages.

According to an embodiment, the switching further comprises deleting the first cryptographic keys. Embodiments may have the beneficial effect of saving storage space. According to an alternative embodiment, the switching further comprises archiving the first cryptographic keys.

According to an embodiment, additional first messages received by the publish-subscribe system from the publisher for the topic alias each are assigned to the common second topic, assigned with one of the second cryptographic keys of the second set of second cryptographic keys, and encrypted using the assigned second cryptographic key.

Embodiments may have the beneficial effect that additional first messages, in particular first messages received during re-encryption, may directly be encrypted with the second cryptographic keys and assigned to the common second topic.

A topic alias may be used for implementing the key rotation. For the clients of the publish-subscribe system, such a topic alias appears as a normal topic, but is actually an intermediary to another topic. Topic aliases may be managed through administrative actions. Minimal administrative actions to support the existence and management of topic aliases may comprise: creating an alias; assigning a created alias to a topic; detaching an alias from a topic; and deleting a detached alias.

A topic alias which exists but is not assigned may be treated by a broker either as non-existent or inactive. This may be an implementation choice and affects the error messages returned when clients attempt to address unassigned aliases. A configurable option allows the automatic withdrawal of the visibility of a topic once an alias has been assigned. This forces clients to access the underlying data exclusively through the topic alias.

Topic aliases may be consistently integrated with all facilities of the respective broker. For example, brokers integrating a schema registry may support the registration and updating of aliases in the registry. Likewise, security policies may apply equally to topic aliases as they do to normal topics.

A general workflow for rotating a topic encryption key using a topic alias may comprise: creating a topic and a topic alias; and assigning the alias to the topic and configure the topic alias for encryption. Clients may begin to send and receive messages through the alias. The key rotation is initiated comprising: adding a new topic and creating a new cryptographic key for the new topic. The cryptographic key used by the topic encryption module may be updated with the new cryptographic key so that new messages received by the publish-subscribe system are encrypted with the new cryptographic key. A re-encryption process is started, copying the data, i.e., messages, from the old topic to the newly created topic and re-encrypting the data copied with the new cryptographic key. The re-encryption process may append new messages, which arrived during re-encryption, to the new topic. When all data comprised by the old topic has been copied to the new topic and re-encrypted, the re-encryption process is ended and the alias re-assigned to the new topic. Optionally, the previously active topic logs of the old topic may be deleted. The aforementioned workflow may be done transactionally.

A topic alias may for example be implemented in a proxy or directly in a broker of the publish-subscribe system. For example, the publish-subscribe system may comprise a proxy. In case a proxy is implemented in the publish-subscribe system, the clients may not communicate with a broker of the publish-subscribe system directly, but rather via the proxy. Similarly, the broker may communicate with the clients via the proxy. Proxies may, e.g., be used for tasks like introducing specific access control models into a publish-subscribe system.

The functions of a proxy may be extended to support a topic alias. In this approach, one or more independent topics may be associated together into the same alias group. The creation and management of this alias group is handled outside the broker. An alias group is specified in the same way as a topic, e.g., number of partitions, number of replicas, etc. Topics may be added/removed to/from the alias group, which leads to the creation of the corresponding topic on the cluster of the publish-subscribe system using the alias group configuration. For example, all topics in the same group may have the same configuration. Zero or one topic at any given moment is designated the active topic.

Clients may use a standard protocol of the publish-subscribe system to communicate with the topic alias as if it were a normal topic. In particular, program instructions controlling the brokers of the publish-subscribe system may not have to be altered. Producers may use the standard protocol to send messages to the topic alias and consumer may use the standard protocol to receive messages from it. However, there is no topic log with the alias name on a broker or a cluster of brokers of the publish-subscribe system. Instead the proxy may rather map the alias name provided by the topic alias onto the name of a topic on the broker or the cluster of the publish-subscribe system. The respective topic to which the topic alias refers may play the role of the actual active topic, such that the topic alias appears to be an actual active topic.

As the encryption module is integrated in the proxy, the proxy may encrypt messages sent to the topic alias and decrypts message that are to be received from the topic alias. To achieve this, the proxy or more precisely the encryption module integrated into the proxy may use the current cryptographic key. As previously mentioned, the current cryptographic key used for encryption may be added in a wrapped form to a message header of the encrypted message for storage and removed from the message header upon decryption for responding to client requests.

Alternatively, the topic alias may be implemented in a broker of the publish-subscribe system. Such an implementation may require altering program instructions controlling the brokers of the publish-subscribe system. If the program instructions of the brokers can be altered, the topic alias may be implemented in the broker without requiring an additional proxy. An implementation without requiring a proxy may have the beneficial effect of being able to remove one additional architectural component from system. However, a proxy may still be used for other benefits, e.g., for introducing specific access control models into a publish-subscribe system. The notion of alias and alias groups remains the same as described above, only they are integrated directly in the broker along with the encryption module.

A second technique implements a new re-encryption service. Such a new re-encryption service may, e.g., extend a broker's internal topic management services of a broker. Analogous to a log cleaner of publish-subscribe system, a re-encryption service may progressively replace stored messages with re-encrypted versions in the background. For very large topic logs, an optimization is provided whereby the lead broker coordinates other brokers in the cluster to share the re-encryption workload, thereby parallelizing the computation. This second technique also runs without interruption of the broker service.

According to an embodiment, the switching of the encrypted first messages with the assigned first cryptographic keys to the re-encrypted first messages with the assigned replacement keys comprises replacing each of the encrypted first message with the corresponding re-encrypted first message. Embodiments may have the beneficial effect implementing the re-encryption using re-encryption service, e.g., of a broker of a publish-subscribe system.

According to an embodiment, the re-encryption of the first messages and the replacing of the encrypted first message with the corresponding re-encrypted first message may be executed successively. The encrypted first messages may, e.g., be stored in segment files, which are re-encrypted successively. For example, the successive re-encryption may be started with a latest one of the segment files, i.e. a timewise youngest segment file.

According to an embodiment, the encrypted first messages are stored in a set of segment files. One of the segment files of the set of segment files is currently used for storing encrypted first messages, while the remaining segment files of the set of segment files already filled with encrypted first messages are closed. If the open segment file is full, the open segment file is closed, an additional segment file is added to the set of segment files and the additional segment file is used for storing encrypted first messages.

Upon starting the re-encryption, the segment file currently used for storing encrypted first messages is closed and a further additional segment file is added to the set of segment files and used for storing additional encrypted first messages received by the publish-subscribe system from the publishers for the common first topic.

The re-encryption of the encrypted first messages is performed segmentally. The segmental re-encryption comprises selecting the remaining closed segment files one after another, generating for each of the selected segment files a replacement segment file comprising the encrypted first messages of the selected segment file in encrypted form, and replacing the selected segment file with the replacement segment file.

Embodiments may have the beneficial effect that the first messages are re-encrypted successively in an ordered way.

According to an embodiment, the segmental re-encryption is started with a latest segment file of the set of segments files. The latest, i.e., timewise youngest, segment may be the segment file most recently closed, which comprises the most recently received messages. The offsets of these most recent messages have the smallest differences to an offset of the messages with which the encryption using the second cryptographic key is started within a storage of the publish-subscribe system. Embodiments may further have the beneficial effect that the most recent messages, i.e., the most up-to-date messages, may be the messages which will first be available in re-encrypted form. According to embodiments, segment files may be deleted, e.g., when a maximum retention time for the messages comprised by the respective segment files expires. Embodiments may further have the beneficial effect that the oldest messages may be re-encrypted at last, preventing the publish-subscribe system from an unnecessary re-encryption of messages which may be deleted later on during the key rotation due to an expiring of their maximum retention times.

According to an embodiment, an offset value is determined identifying an offset of an additional first messages with which the encryption using the second cryptographic key is started within a storage of the publish-subscribe system. According to an embodiment, the determined offset value is stored. Embodiments may have the beneficial effect of enabling the publish-sub scribe system, e.g., a broker of the publish-subscribe system, to determine using the offset value, when the re-encryption is finished.

According to an embodiment, additional first messages received by the publish-subscribe system from the publishers for the common first topic each are assigned to the common first topic, assigned with one of the second cryptographic keys of the second set of second cryptographic keys, and encrypted using the assigned second cryptographic key.

Embodiments may have the beneficial effect that additional first messages, in particular first messages received during re-encryption, may directly be encrypted with the second cryptographic keys and assigned to the common first topic.

According to an embodiment, the publish-subscribe system comprises a plurality of additional brokers. The publish-subscribe system comprises a plurality of additional replicas of the set of segments files. Each of the additional replicas is assigned to one of the additional brokers. The re-encryption of the segment files is distributed between the brokers of the publish-subscribe system implementing a parallelization of the re-encryption. Re-encrypted first messages are distributed to the other replicas of the set of segment files.

Embodiments may have the beneficial effect of implementing a parallelization of the re-encryption. This, the re-encryption may be performed more efficiently.

A key rotation with re-encryption may, e.g., be implemented using an internal broker service. Thus, instead of introducing a topic alias, a topic management within the broker may rather be extended by additional features. Such an approach may require changing and/or extending known protocols used to control brokers in publish-subscribe system. Such embodiments may have the beneficial effect of being more efficient, e.g., compared to introducing an additional topic alias and/or using an additional proxy.

A publish-subscribe system may store data, like messages, associated with a topic partition in a directory whose name may be the topic partition name and whose content may comprise log segment files containing the actual messages as well as some files containing metadata. The log segment files may have fixed maximum size, e.g. 100 MB. When a log segment is full, a new log segment file may be created and messages are then added to the newly created log segment file. The publish-subscribe system may run background threads that delete log segments files, for example when the maximum retention time of messages expires. For compacted topics without a maximum retention time, a compaction process may be used to compact these topics. For example, only the last valid value for a given key may be available in the topic and keys that map to a null value may be removed.

Similar to a so-called log cleaner services such as the aforementioned compaction and expiration services, a re-encryption process may be added as an encryption service to a broker of a publish-subscribe system re-encrypting data of segment files using new encryption keys as replacement keys for current encryption keys. As soon as the re-encryption process is started, all new messages may be encrypted using the new cryptographic key. The broker may store an offset value indicating offset of the stored messages at which the brock starts using the new cryptographic key for encrypting new messages. The actual re-encryption of old messages already stored in the publish-subscribe system and encrypted with the old cryptographic key may be initiated. The broker may re-encrypt all old messages starting with the offset value determined and continuing until the oldest messages are reached and re-encrypted as well. Once the last old message is re-encrypted, the re-encryption process may be finished and the old key may be discarded.

Assuming for example a 100 MB maximum log segment size, then for a 1 TB topic partition there would be 10,000 log segment files of that size. Re-encryption may involve decrypting and encrypting all of these segment files. According to embodiments, the re-encryption may be performed by a single broker, e.g., the leader broker, alone and re-encrypted log segment files distributed to the followers. According to embodiments, the re-encryption may be performed by a plurality of brokers of the publish-subscribe system implementing a parallelization of the re-encryption. For example, internal protocols controlling the brokers of the publish-subscribe system may be altered such that all brokers having a replica of a partition may coordinate amongst themselves such that each of them re-encrypts some subset of the log segment files comprised by the replica and then exchanges the re-encrypted segment files with all the other brokers having a replica of the same partition.

Embodiments may have the beneficial effect that only the broker-to-broker interaction may change due to the parallelization of the re-encryption, while the clients of the publish-subscribe system may remain unaware that the brokers are doing this. Thus, such a parallelization may be suitable as an optimization in a publish-subscribe system comprising a managed server offering.

An exemplary algorithm used for re-encrypting a topic using segment files comprise the following:

```
function REKEYLOG(segmentFiles, oldKey, newKey, oldKeyOffsets)
    i ← segmentFiles.length
    while i > 0 do
        if segmentFiles[i].exists then
            if segmentFiles[i].lastOffset > oldKeyOffsets.start and
            segementFiles[i].baseOffset < oldKeyOffsets.end then
                newFile ← emptyFile
                for r in readrecords(segmentFiles[i]) do
                    decryptedRecord ← decrypt(r, oldKey)
                    newRecord ← encrypt(decryptedRecord, newKey)
                    newFile.append(newRecord)
                end for
                switch(segmentFiles[i], newFile)
            else
                break // older segment files have been removed
            end if
        end if
    end while
end function
```

For example, the computer program product may further comprise program instructions executable by a processor of a computer system of a publish-subscribe system configured to implement any of the embodiments of the method for a cryptographic key rotation in the publish-subscribe system described herein.

For example, the computer system further is configured to execute any of the embodiments of the method for a cryptographic key rotation in a publish-subscribe system described herein.

FIG. 1 shows an exemplary computer system 100 configured for a cryptographic key rotation in a publish-subscribe system. The exemplary computer system 100 may for example be a broker or a proxy of the publish-subscribe system. It will be appreciated that the computer system 100 described herein may be any type of computerized system comprising a plurality of plurality of processor chips, a plurality of memory buffer chips and a memory. The computer system 100 may for example be implemented in form of a general-purpose digital computer, such as a personal computer, a workstation, or a minicomputer. The computer system 100 may for example be implemented in form of a server.

In exemplary embodiments, in terms of hardware architecture, as shown in FIG. 1, the computer system 100 includes a processor 105, memory (main memory) 110 coupled to a memory controller 115, and one or more input and/or output (I/O) devices (or peripherals) 140, 145 (shown as a peripheral storage medium) that are communicatively coupled via a local input/output controller 135. The input/output controller 135 may be, but is not limited to, one or more buses or other wired or wireless connections, as is known in the art. The input/output controller 135 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 105 is a hardware device for executing software, particularly that stored in memory 110. The processor 105 may be any custom made or commercially available processor, a central processing unit (CPU), an auxiliary processor among several processors associated with the computer system 100, a semiconductor-based microprocessor (in the form of a microchip or chip set), a macroprocessor, or generally any device for executing software instructions.

The memory 110 may include any one or combination of volatile memory modules (e.g., random access memory (RAM, such as DRAM, SRAM, SDRAM, etc.)) and non-volatile memory modules (e.g., ROM, erasable programmable read only memory (EPROM), electronically erasable programmable read only memory (EEPROM), or programmable read only memory (PROM)). Note that the memory 110 may have a distributed architecture, where additional modules are situated remote from one another, but may be accessed by the processor 105.

The software in memory 110 may include one or more separate programs, each of which comprises an ordered listing of executable instructions for implementing logical functions, notably functions involved in embodiments of this disclosure. The executable instructions may further be configured for a cryptographic key rotation in a publish-subscribe system. In particular, the executable instructions may be configured for a re-encryption of messages of the publish-subscribe system using an encryption module provided by the computer system 100, e.g., in form of the executable instructions. The software in memory 110 may further include a suitable operating system (OS) 111. The OS 111 essentially controls the execution of other computer programs, such as possibly software 112.

If the computer system 100 is a PC, workstation, intelligent device or the like, the software in the memory 110 may further include a basic input output system (BIOS) 122. The BIOS is a set of essential software routines that initialize and test hardware at startup, start the OS 111, and support the transfer of data among the hardware devices. The BIOS is stored in ROM so that the BIOS may be executed when the computer system 100 is activated.

When the computer system 100 is in operation, the processor 105 is configured for executing software 112 stored within the memory 110, to communicate data to and from the memory 110, and to generally control operations of the computer system 100 pursuant to the software. The methods described herein and the OS 111, in whole or in part, but typically the latter, are read by the processor 105, possibly buffered within the processor 105, and then executed.

Software 112 may further be provided stored on any computer readable medium, such as storage 120, for use by or in connection with any computer related system or method. The storage 120 may comprise a disk storage 127 such as HDD storage. The messages of the publish-subscribe system may be stored on the computer system 100 using an internal storage, like storage 120, or a peripheral storage, like storage medium 145. Alternatively, or additionally, messages of the publish-subscribe system may be stored on other computer system, like computer system 170, e.g., accessible for the computer system 100 via a network, like network 160. Alternatively, or additionally, cryptographic keys used for encrypting and decrypting messages of the publish-subscribe system may be stored on or accessible for the computer system 100.

For example, a conventional keyboard 150 and mouse 155 may be coupled to the input/output controller 135. Other output devices such as the I/O devices 10 may include input devices, for example but not limited to a printer, a scanner, microphone, and the like. Finally, the I/O devices 140, 145 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The I/O devices 140, 145 may include any generalized cryptographic card or smart card known in the art. The computer system 100 may further include a display controller 125 coupled to a display 130. For example, the computer system 100 may further include a network interface for coupling to a network 160, like an intranet or the Internet. The network may be an IP-based network for communication between the computer system 100 and any external server, like computer system 170, other client and the like via a broadband connection. Computer system 170 may for example be a publisher computer system, a subscriber computer system, a broker server, e.g. of a cluster of brokers, or a proxy of the publish-subscribe system. The network 160 transmits and receives data, e.g., messages, between the computer system 100 and computer system 170. For example, network 160 may be a managed IP network administered by a service provider. The network 160 may be implemented in a wireless fashion, e.g., using wireless protocols and technologies, such as Wi-Fi, WiMAX, etc. The network 160 may also be a packet-switched network such as a local area network, wide area network, metropolitan area network, Internet network, or other similar type of network environment. The network may be a fixed wireless network, a wireless local area network (LAN), a wireless wide area network (WAN) a personal area network (PAN), a virtual private network (VPN), intranet or other suitable network system and includes equipment for receiving and transmitting signals.

Figure 2:
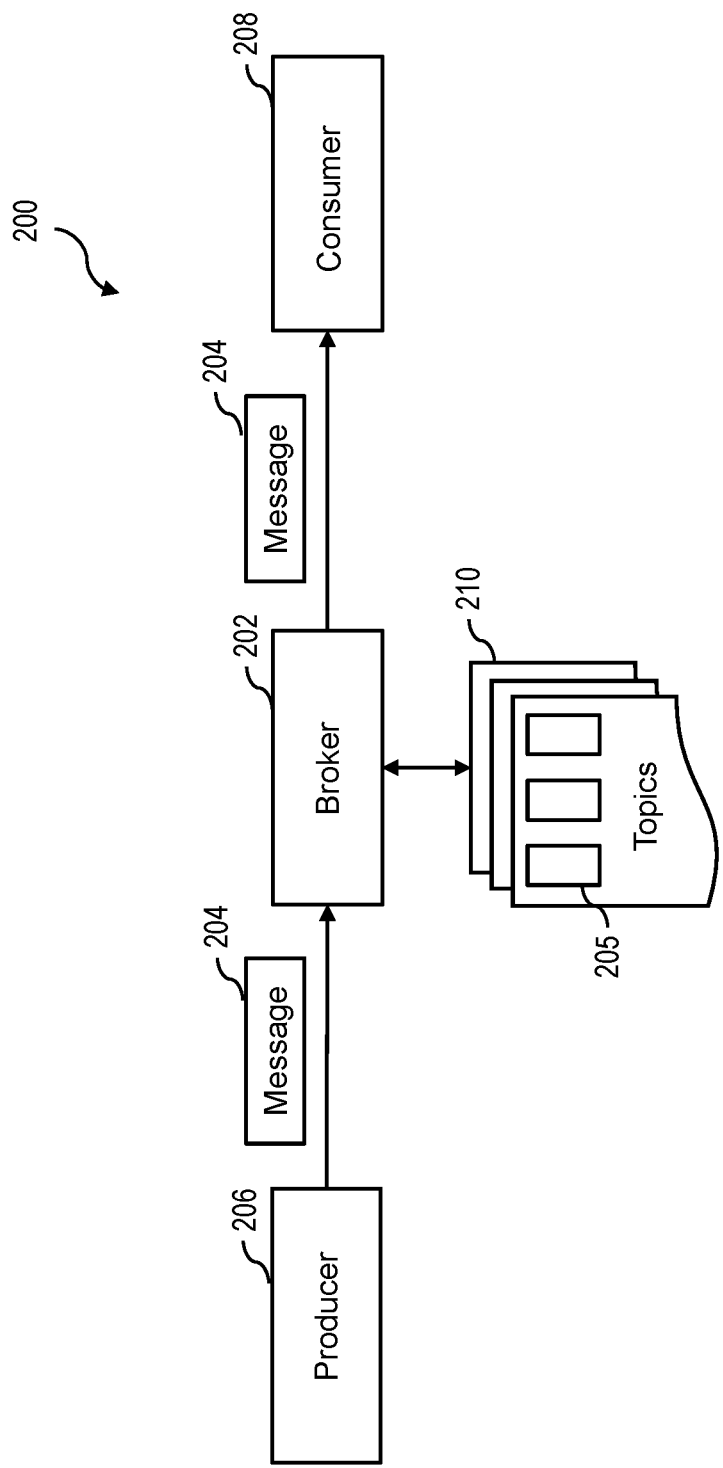
FIG. 2 depicts a schematic diagram illustrating an exemplary publish-subscribe system.

FIG. 2 shows an exemplary publish-subscribe system 200. The publish-subscribe system 200 comprises one or more broker 202 configure to receive messages 204 from one or more producers 206, i.e., publishers, of the received messages 204. The messages 204 are assigned to topics 210. The broker 202 stores revived messages 204 in message logs of the topics 210. Consumers 208, i.e., subscribers, may subscribe to one or more of the topics 210. Messages 204 stored in the topics 210 are forwarded by the broker 202 to the consumers 208 subscribing to the respective topics 210.

The broker 202 comprised by the publish-subscribe system 200 may be configured as an encrypting broker comprising an encryption module. The encryption module may be implemented in form of an internal component of the encrypting broker 202 configured for handling cryptographic operations, like encrypting and decrypting messages. The encrypting broker 202 may encrypt messages 204 received from a producer 206 resulting in an encrypted message 205, which is stored in a message log of a topic 210 to which the message 204 is assigned. The encrypting broker 202 may further decrypt the encrypted messages 205 stored in the message logs of the topic 210 in order to returning the original messages 204, i.e., the messages in unencrypted form, to consumer 208 which have subscribed to the respective topics 210 provided by the publish-subscribe system 200.

Such a publish-subscribe system 200 uses a publish-subscribe architecture, also referred to as publish-subscribe pattern. A broker 202 publish-subscribe system 200 may persists all messages 204 received as logs to a file system. The messages 204 are written to and read from categories, so-called topics 210. The publish-subscribe system 200 may provide a massively scalable publish-subscribe message queue designed as a transaction log. For example, a plurality of brokers 202 forming a cluster may be provided and the transaction log may be implemented as a distributed transaction log distributed over the cluster.

Figure 3:
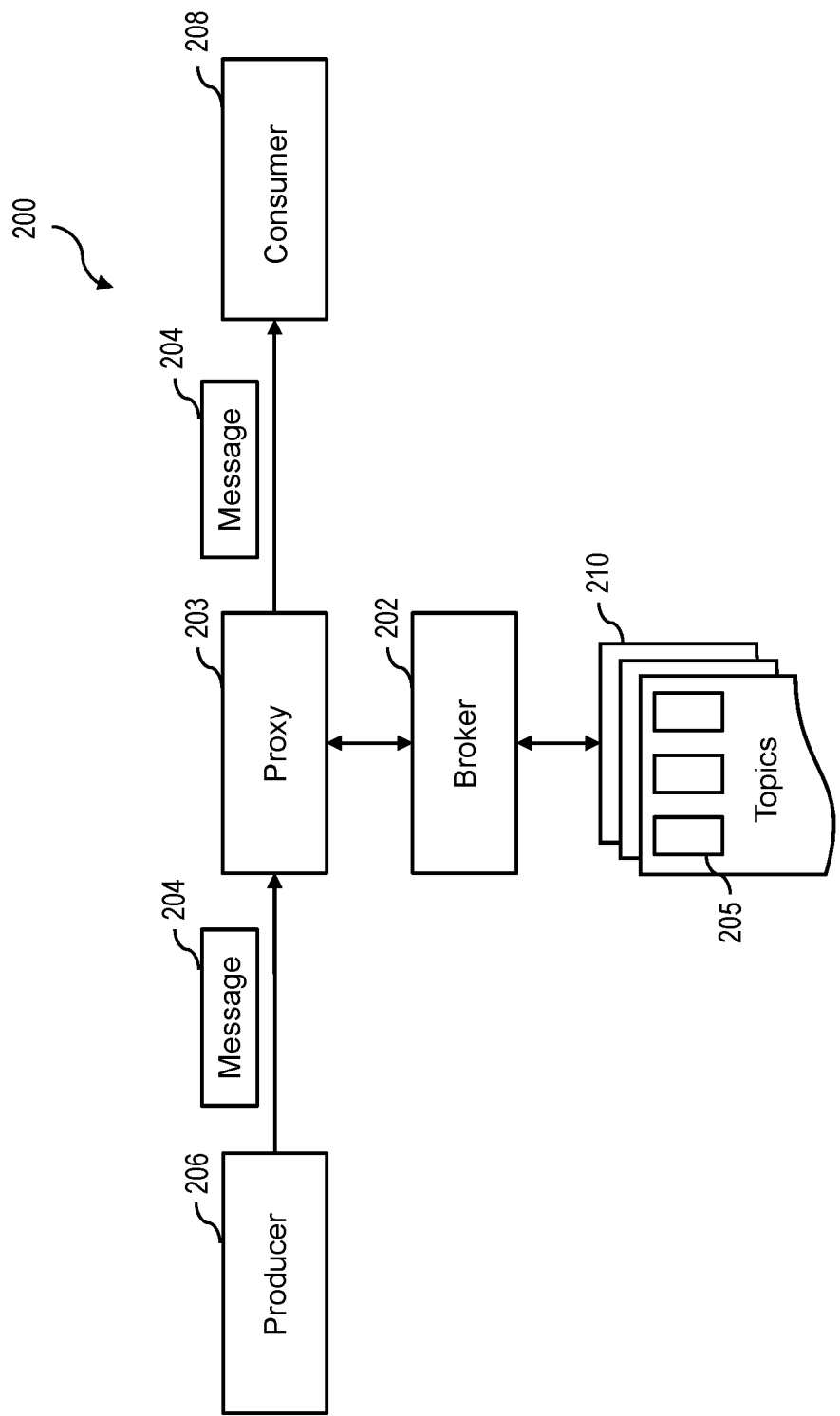
FIG. 3 depicts a schematic diagram illustrating an exemplary publish-subscribe system.

FIG. 3 shows a further exemplary publish-subscribe system 200. The publish-subscribe system 200 of FIG. 3 corresponds to the publish-subscribe system 200 of FIG. 2, but in addition comprises a proxy 203. Clients of the publish-subscribe system 200, i.e., the producers 206 and the consumers 208, do not communicate with the broker 202 of the publish-subscribe system 200 directly, but rather via the proxy 203. Similarly, the broker 202 may communicate with the clients 206, 208 via the proxy 203. The proxies 203 may, e.g., be configured to implement access control measures into the publish-subscribe system 200.

Figure 4:
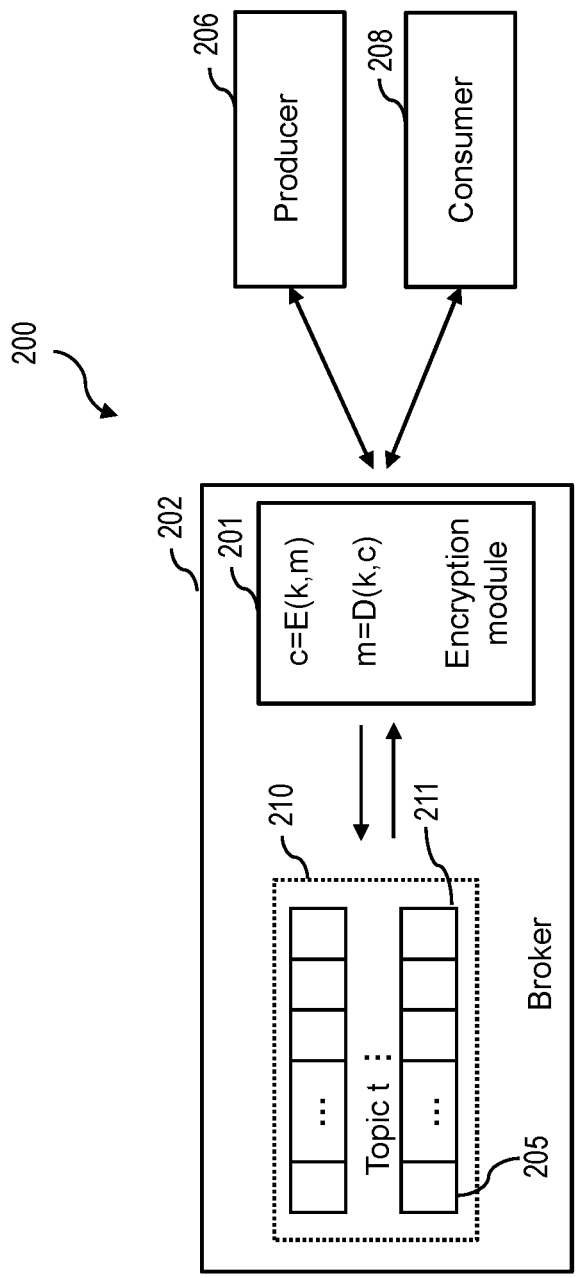
FIG. 4 depicts a schematic diagram illustrating an exemplary publish-subscribe system with topic encryption implemented in a broker.

FIG. 4 illustrates an exemplary encrypting massage broker 202 in more detail. The encrypting massage broker 202 comprises an encryption module 201. The encryption module 201 is configured to encrypt messages m received from a producer 206 using a cryptographic key k. The encryption of a messages m by the encryption module 201 using the cryptographic key k may result in a ciphertext c=E(k,m), i.e., an encrypted message, which is stored in a message log of a topic t 210. The encryption module 201 uses an encryption function E for generating the ciphertext c=E(k,m). The message log of topic 210 may comprise a plurality of encrypted messages 205 stored in segments files 211. In case an encrypted message 205 stored in a segment file 211 of topic t 211 should be forwarded to a consumer 208 subscribing to the topic t 210, the encrypted message 205 read from the storage of broker 202 and provided in form of a ciphertext c to the encryption module 201. The encryption module 201 uses a decryption function D for recovering the original unencrypted message m=D(k,c) from the ciphertext c with the cryptographic key k.

Examples may have the beneficial effect of improving security by enabling a rotation of encryption keys. Key rotations may, e.g., be performed periodically, e.g., as a measure of risk management. For example, security regulations may require a periodical key rotation. Key rotations may, e.g., be performed in response to an incident challenging the security of a cryptographic key in use. A key rotation comprises a changing of keys and may entail a re-encrypting of existing encrypted data with the new key(s).

Figure 5:
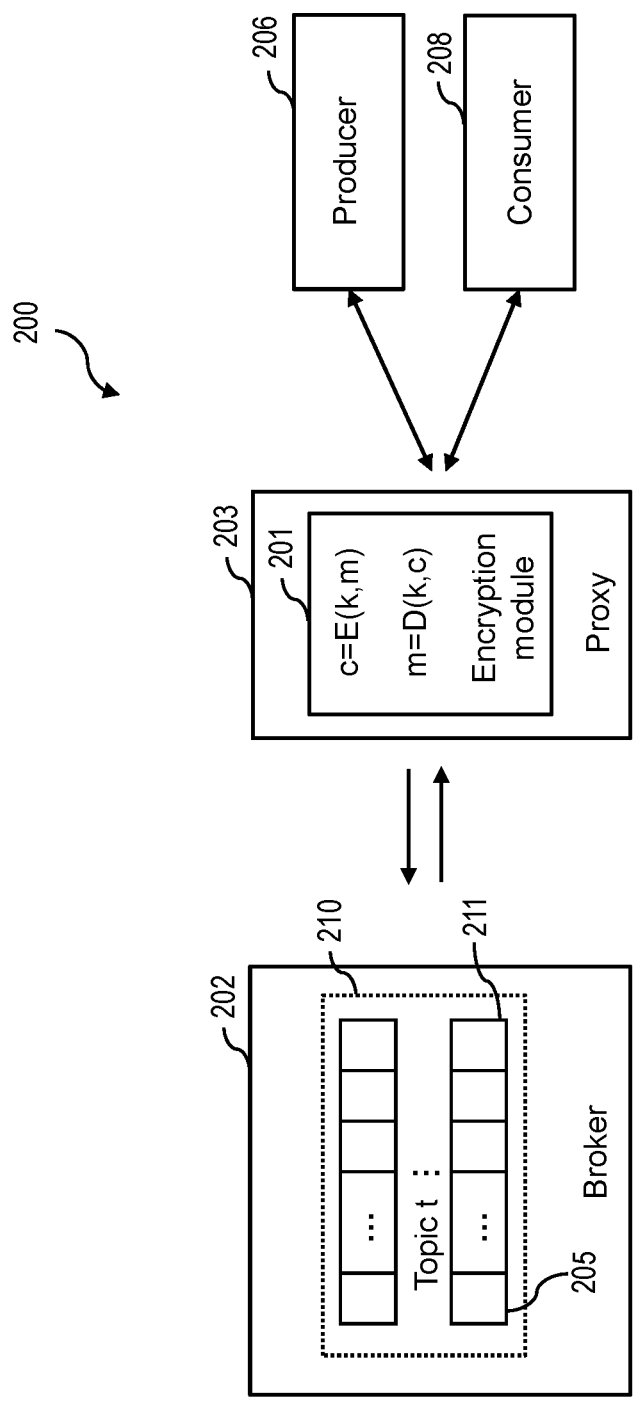
FIG. 5 depicts a schematic diagram illustrating an exemplary publish-subscribe system with topic encryption implemented in a proxy.

FIG. 5 illustrates a further exemplary publish-subscribe system 200 with a massage broker 202 and a proxy 203. Clients 206, 208 of the publish-subscribe system 200 may communicate with the broker 202 via the proxy 203. Similarly, the broker 202 may communicate with the clients 206, 208 via the proxy 203. In case of FIG. 5, the encryption module 201 for encrypting and decrypting messages is comprised by the proxy 203. Thus, the proxy 203 may be configured for encrypting and decrypting messages. The proxy 203 may, e.g., further be configured to implement access control measures into the publish-subscribe system 200. The proxy may encrypt incoming messages m resulting in ciphertexts c=E(k,m), which are forwarded for storing in topic t 210 by the broker 202, and decrypt ciphertexts c resulting in outgoing messages m=D(k,c), which are forwarded to consumers 208 subscribing topic t.

A publish-subscribe system 200 like the one shown in FIGS. 2 to 5 may be continuously online, i.e., may continuously receive and send messages. Such publish-subscribe systems 200 are being increasingly relied upon to store and distribute data, e.g., within an organization. In the following examples may be described for a key rotation allowing to replace cryptographic keys k used by publish-subscribe systems 200 to encrypt end decrypt messages with replacement keys. These examples may have the beneficial effect of enabling an effective and efficient re-encryption of a high volume of data as large as data volumes comprised by publish-subscribe systems 200. Example may not require bringing the publish-subscribe system 200 offline in order for re-encrypting messages stored by the publish-subscribe system 200. In the following different approaches are described to re-encrypt topic data, i.e., messages of a topic, stored in a broker 202 of a publish-subscribe system 200 without interrupting the publish-subscribe system 200.

One approach may be based on a creation of a topic alias used for enabling a re-encryption without interrupting the publish-subscribe system 200. A further approach may be based on an extension of a broker 202 with a re-encryption service enabling a re-encryption without interrupting the publish-subscribe system 200. Both approaches may have the beneficial effect of enabling the broker 202 to continue to run uninterrupted. Clients 206, 208 of the broker 202 may thus be oblivious to the re-encryption at the broker 202. For the re-encryption in addition a proxy 203 may be used. The approaches may further have the beneficial effect of preserving message metadata by the re-encryption process.

Figure 6:
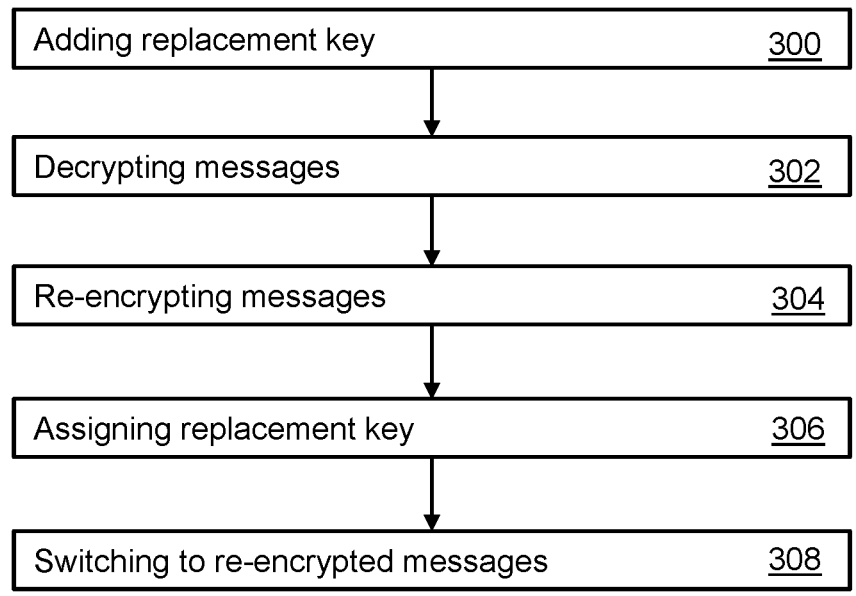
FIG. 6 depicts a schematic flow diagram of an exemplary method for a cryptographic key rotation.

FIG. 6 shows a schematic flow diagram of an exemplary method for a cryptographic key rotation in a publish-subscribe system, like the publish-subscribe system 200 of FIG. 4 or FIG. 5. The publish-subscribe system stores a plurality of messages. Each of the stored messages is assigned to a topic from a group of one or more topics. Each of the stored messages is assigned with a cryptographic key of a group of one or more cryptographic keys and encrypted with the assigned cryptographic key. The publish-subscribe system provides a broker service for routing the stored messages to one or more subscribers of the topics to which the routed messages are assigned. The routing comprises decrypting the message to be routed using the assigned cryptographic key of the respective message and sending the decrypted messages to one or more of the subscribers of the assigned topic.

The cryptographic key rotation comprises a re-encryption of each message of a first set of one or more first messages of the stored messages. Each of the first messages is assigned to a common first topic from the group of topics, assigned to a first cryptographic key of a first set of one or more first cryptographic keys of the group of cryptographic keys, and encrypted with the assigned first cryptographic key. The re-encryption is executed by an encryption module of the publish-subscribe system as a background process, while continuing routing first messages from and receiving additional first messages for the common first topic by the broker service.

In block 300, one or more second cryptographic keys are added as replacement keys for the one or more first cryptographic key used for encrypting the first messages of the first topic. For example, a single first cryptographic key may be assigned to the first topic and all the messages assigned to the first copy may be encrypted using the respective single first cryptographic key. In this case, a single second cryptographic key may, e.g., be added for first topic in order to replace the previously used first cryptographic key. For example, a plurality of first cryptographic key may be assigned to the first topic and different messages assigned to the first copy may be encrypted using different first cryptographic keys. In this case, a plurality of second cryptographic keys may, e.g., be added for first topic comprising a replacement key for each of the previously used first cryptographic keys.

In block 302, the each of the first messages assigned to the first topic may be decrypted using the first cryptographic key assigned to the respective first messages. In block 304, each of the decrypted first messages may be re-encrypted using one of the replacement keys added in block 300. For example, the replacement keys are assigned to the previously used first cryptographic key as replacement keys. In block 306, the replacement keys used to re-encrypt the re-encrypted first messages may be assigned to the respective re-encrypted first messages. In block 308, the publish-subscribe system switches from using the encrypted first messages and the assigned first cryptographic keys for the routing to using the re-encrypted first messages and the assigned replacement keys. In addition, the previously used encrypted first messages and/or the previously used first cryptographic keys may be deleted.

Figure 7:
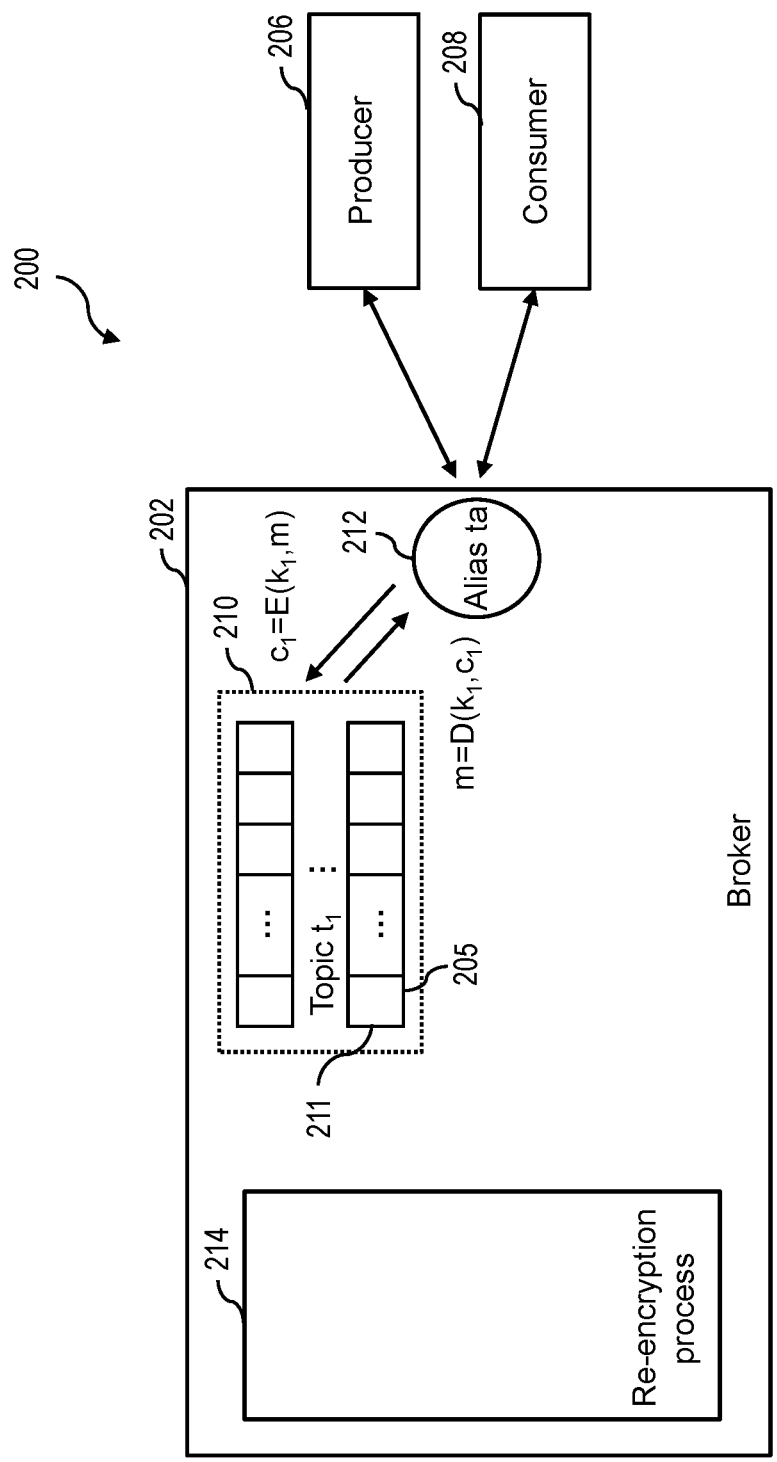
FIG. 7 depicts a schematic diagram illustrating an exemplary publish-subscribe system with a topic alias implemented in a broker.

FIG. 7 shows an exemplary publish-subscribe system 200 implementing a cryptographic key rotation using a topic alias ta 212. For the clients 206, 208 of the publish-subscribe system 200, the topic alias ta 212 appears as a normal topic, but is actually an intermediary to another topic $t_1$ 210. Messages may be received from the producer 206 assigned to the topic alias ta 212. The topic alias ta 212 may point to the topic $t_1$ 210, such that the received message is further assigned to the topic $t_1$ 210 and stored in a segment file 211 of a message log of topic $t_1$ 210. For this purpose, a received message m may be encrypted using a cryptographic key $k_1$, e.g., a cryptographic key $k_1$ assigned the topic $t_1$ 210, and generating a ciphertext $c_1=E(k_1,m)$. This ciphertext $c_1$ may be stored as an encrypted message 205 in the message log of topic $t_1$ 210. A consumer 208 may subscribe the topic alias ta 212, such that encrypted messages 205 stored in the message log of topic $t_1$ 210 are forwarded to the consumer 208. For this purpose, an encrypted message 205 to be forwarded may be read from the message log of topic $t_1$ 210 in form of a ciphertext $c_1$ and decrypted to recover the original unencrypted message $m=D(k_1,c_1)$ from the ciphertext $c_1$ using the cryptographic key $k_1$. The original unencrypted message m may then be sent by the broker 202 to the consumer 208. For the encrypting and decrypting, the broker 202 may use an encryption module as shown in FIG. 4.

Figure 11:
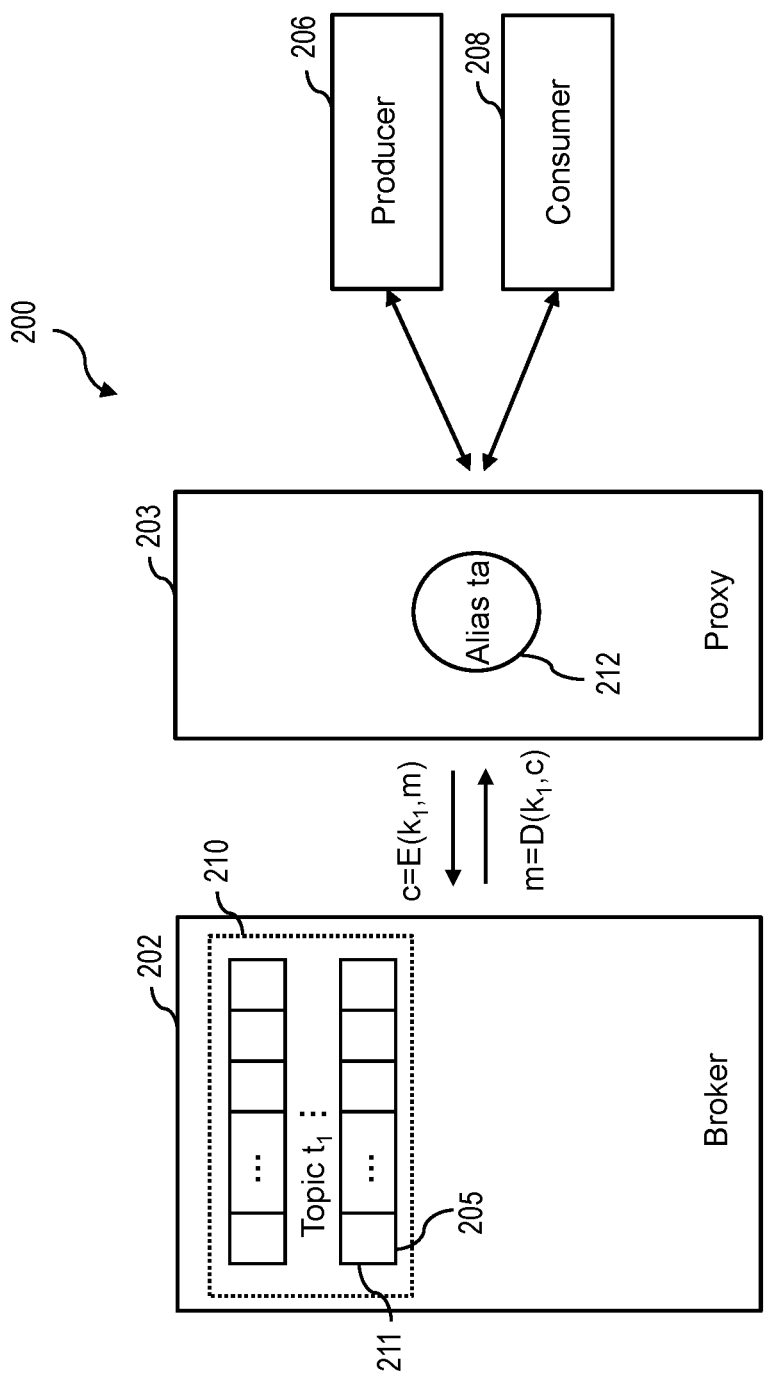
FIG. 11 depicts a schematic diagram illustrating an exemplary publish-subscribe system with a topic alias implemented in a proxy.

Topic aliases, like topic alias ta 212, may be implemented in the broker 202 or in an additional proxy as shown in FIG. 11. A topic alias, like topic alias ta 212, may integrate with all facilities of the broker 202, like, e.g., policies, registry, etc. Such topic aliases may be created and/or deleted by an administrator of the broker 202 or a proxy. Furthermore, administrator actions may comprise an attaching and/or detaching of topic aliases, like topic alias ta 212, to and/or from a concrete topic, like topic $t_1$ 210. A topic alias attached, i.e., assigned, to a concrete topic is an intermediary pointer pointing to the respective concrete topic. When a topic alias is attached to a concrete topic, the respective concrete topic may optionally be hidden from the clients of the publish-subscribe system 200. Clients, like producer 206 and consumer 208, may therefore communicate only with logical, aliased topic, i.e., topic aliases like topic alias ta 212.

For example, the publish-subscribe system may only comprise topic aliases assigned to topics. For example, the publish-subscribe system may also comprise one or more unassigned topic aliases which are not assigned to any topics. Such unassigned topic aliases may be visible for clients, but returning an error, when being used for sending or receiving messages. Alternatively, unassigned topic aliases may be hidden from the clients 206, 208, until they are assigned to a topic.

A re-encryption of the encrypted message 205 stored in the message log of topic $t_1$ 210 may be performed by the broker 202 using a re-encryption process 214 executed in the background, e.g., as background thread. The re-encryption process 214 may for example be executed by an encryption module of broker 202.

Figure 8:
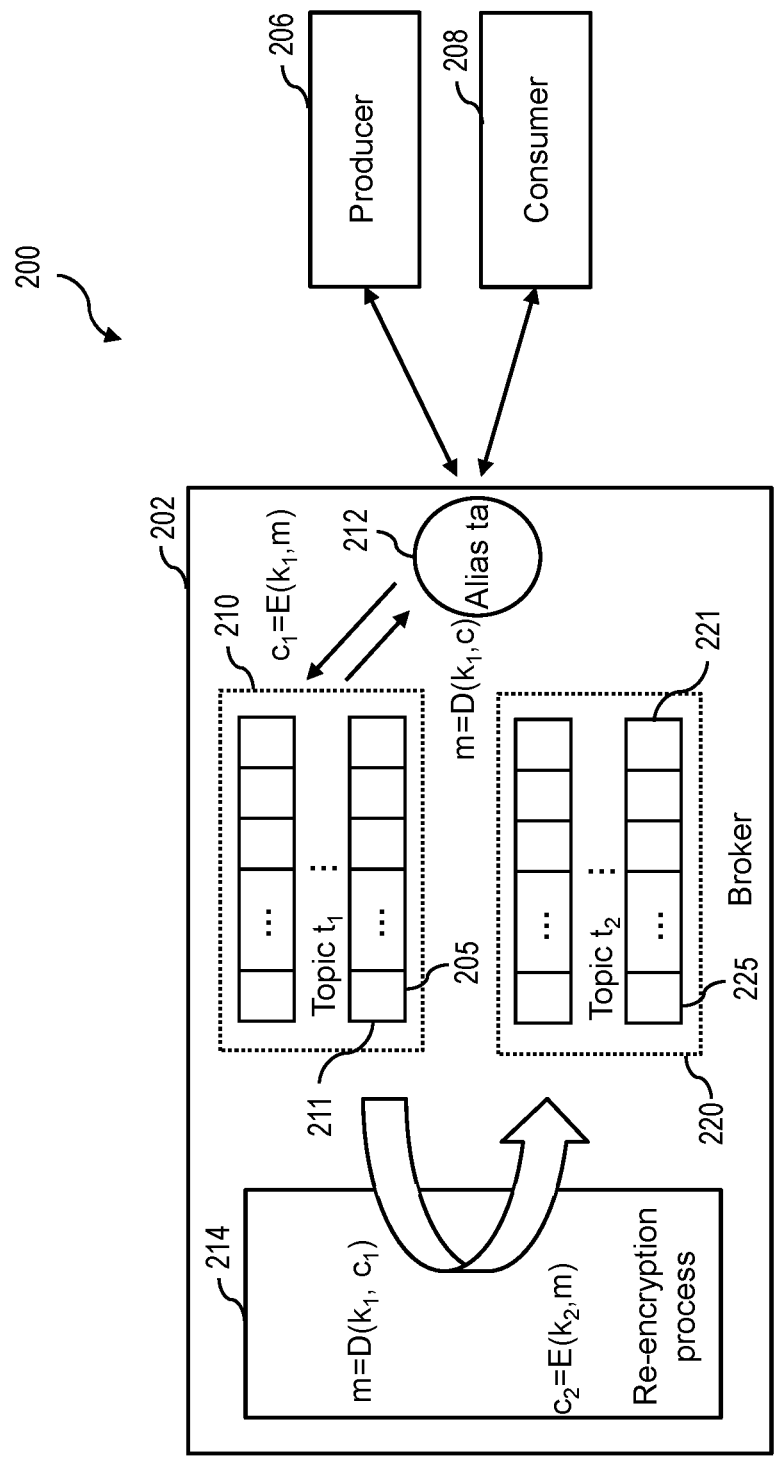
FIG. 8 depicts a schematic diagram illustrating an exemplary publish-subscribe system with a topic alias implemented in a broker.

FIG. 8 shows the publish-subscribe system 200 executing a re-encryption using the re-encryption process 214. The initial situation for the re-encryption may be the arrangement shown in FIG. 7. Using a topic alias, like topic alias ta 212, for the re-encryption may comprise providing a topic, like topic $t_1$ 210. The respective topic $t_1$ 210 may, e.g., be created. Furthermore, the topic alias ta 212 may be provided. The topic alias alias ta 212 may, e.g., be generated. The topic alias ta 212 provided may be assigning to the topic $t_1$ 210 provided. The topic alias ta 212 may be configured for encrypting messages m received from producer 206 for storage in the message log of topic $t_1$ 210, e.g., using an encryption module of the broker 202. The producer 206 may sent the messages m to the topic alias ta 212. Furthermore, the topic alias ta 212 may be configured for decrypting encrypted messages stored in the message log of topic $t_1$ 210, e.g., using an encryption module of the broker 202, in order restore the original messages m to be sent to a consumer 208 subscribing to the topic alias ta 212. The respective messages m may be encrypting and decrypting using the cryptographic key $k_1$ assigned to the topic $t_1$ 210. Clients 206, 208 of the publish-subscribe system 200 may begin to send and receive messages through the topic alias ta 212.

In order to perform a key rotation, i.e., to replace the existing cryptographic key $k_1$ assigned to the existing topic $t_1$ 210 and used for encrypting the encrypted messages 205 stored in the message log of topic $t_1$ 210, a re-encryption may be executed. For example, a re-encryption workflow may be executed comprising adding an additional topic $t_2$ 220. The key rotation may, e.g., be initiated by creating an additional cryptographic key $k_2$ for the additional topic $t_2$ 220. The encryption module may be updated to encrypt new messages, i.e., messages received by the broker 202 or a proxy, using the additional key $k_2$. A re-encryption process of the messages 205 stored in the message log of the existing topic $t_1$ 210 may be started, comprising a copying of the data from the existing topic $t_1$ 210 to the additional topic $t_2$ 220. The copying may comprise a re-encrypting of the messages 205 copied with the additional key $k_2$. For the re-encryption, the respective data comprised in encrypted form by the existing topic may be decrypted using the existing cryptographic key $k_1$ of the existing topic $t_1$ 210 and encrypted using the additional cryptographic key $k_2$ of the additional topic $t_2$ 220. The re-encryption may, e.g., comprise a recovery of the original messages $m=D(k_1, c_1)$ using the ciphertext $c_1$ stored in topic $t_1$ 210 and the existing cryptographic key $k_1$. The recovered original message may be re-encrypted using the additional key $k_2$ and storing the resulting ciphertext $c_2=E(k_2,m)$ as an encrypted message 225 in a segment file 221 in a message log of the additional topic $t_2$ 220.

Figure 9:
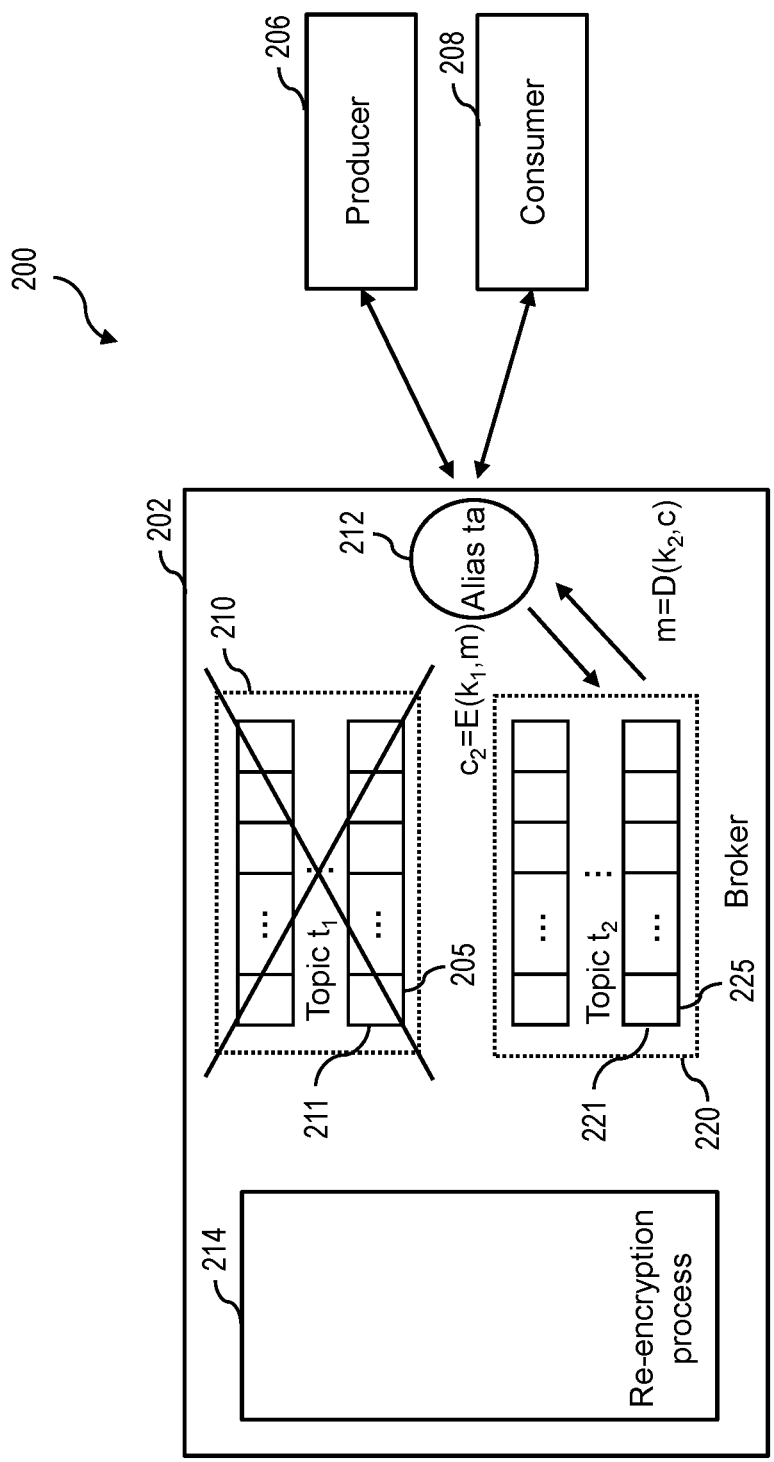
FIG. 9 depicts a schematic diagram illustrating an exemplary publish-subscribe system with a topic alias implemented in a broker.
Figure 10:
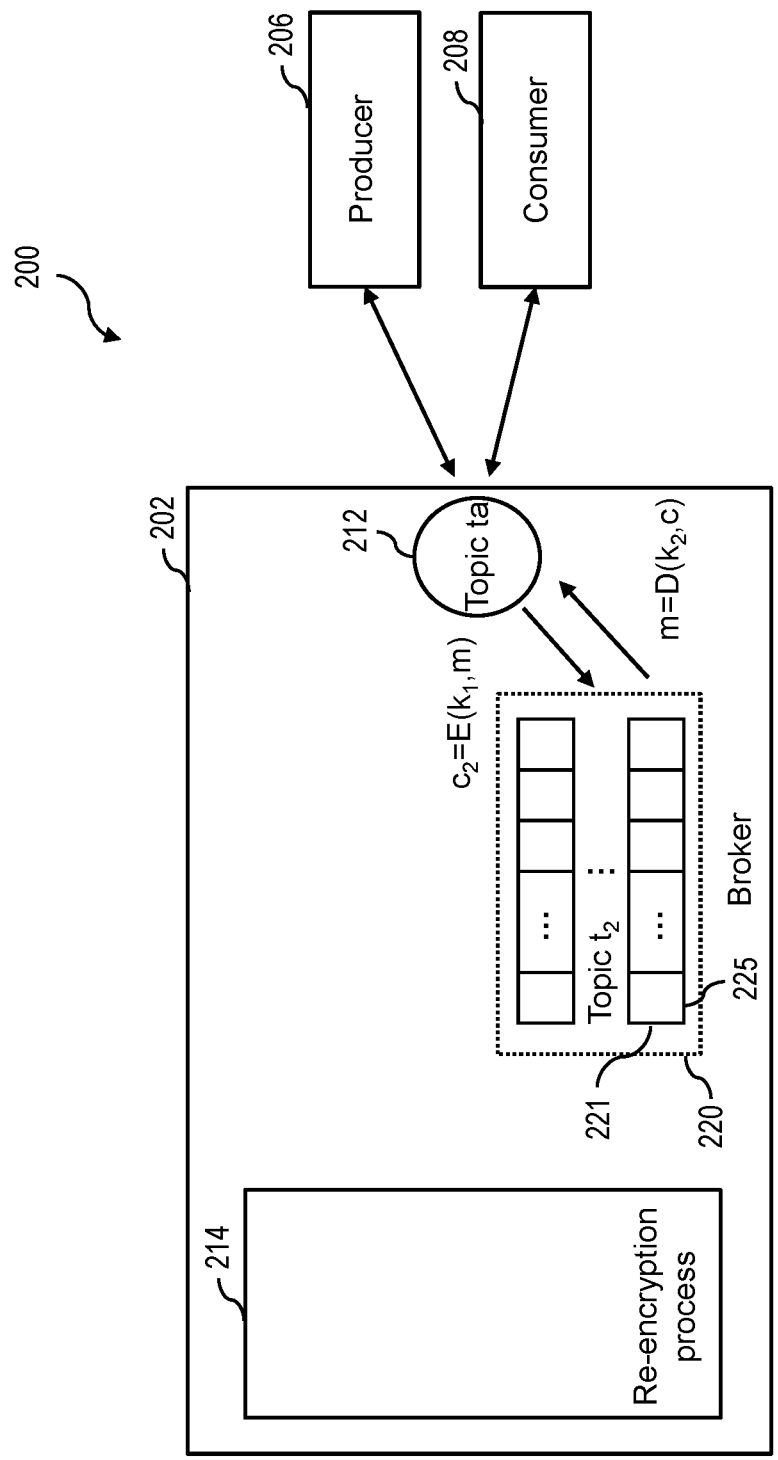
FIG. 10 depicts a schematic diagram illustrating an exemplary publish-subscribe system with a topic alias implemented in a broker.

The re-encryption process 214 may appends any new messages m, which arrived during re-encryption, to the additional topic $t_2$ 220. These new messages m may be encrypted using the additional cryptographic key $k_2$ generating a ciphertext $c_2=E(k_2,m)$ which is stored in the message log of the additional topic $t_2$ 220. When the copying is finished, the topic alias ta 212 may be re-assigned to the additional topic $t_2$ 220. The additional topic $t_2$ 220 may comprise the re-encrypted data copied from the existing topic $t_1$ 210 as well as the new messages encrypted with the additional cryptographic key $k_2$. Thus, the existing topic $t_1$ 210 may become inactive, while the additional topic $t_2$ 220 is activated. Optionally, the previously active topic log, i.e., the message log of the existing topic $t_1$ 210, may be deleted, as shown in FIG. 9, resulting in the situation as shown in FIG. 10. For the clients 206, 208 of the publish-subscribe system 200 the generation of the additional topic $t_2$ 220 and the switching from the existing topic $t_1$ 210 to the additional topic $t_2$ 220 may be invisible. The clients 206, 208 may continue to communicate with the topic alias ta 212. Messages m received from the producer 206 may be encrypted using the additional cryptographic key $k_2$ to generate ciphertexts $c_2=E(k_2,m)$ which are stored as encrypted messages 225 in the message log of the additional topic $t_2$ 220. Furthermore, encrypted messages 225 stored in the message log of the additional topic $t_2$ 220 may be decrypted using the additional cryptographic key $k_2$ to recover the original message $m=D(k_2, c_2)$ and sent to consumers 208 subscribing to the topic alias ta 212. During the whole execution of the re-encryption process 214, the publish-subscribe system 200 may continue its service, i.e., receiving messages m from producers 206 and forwarding the received messages m to consumers 208.

Figure 12:
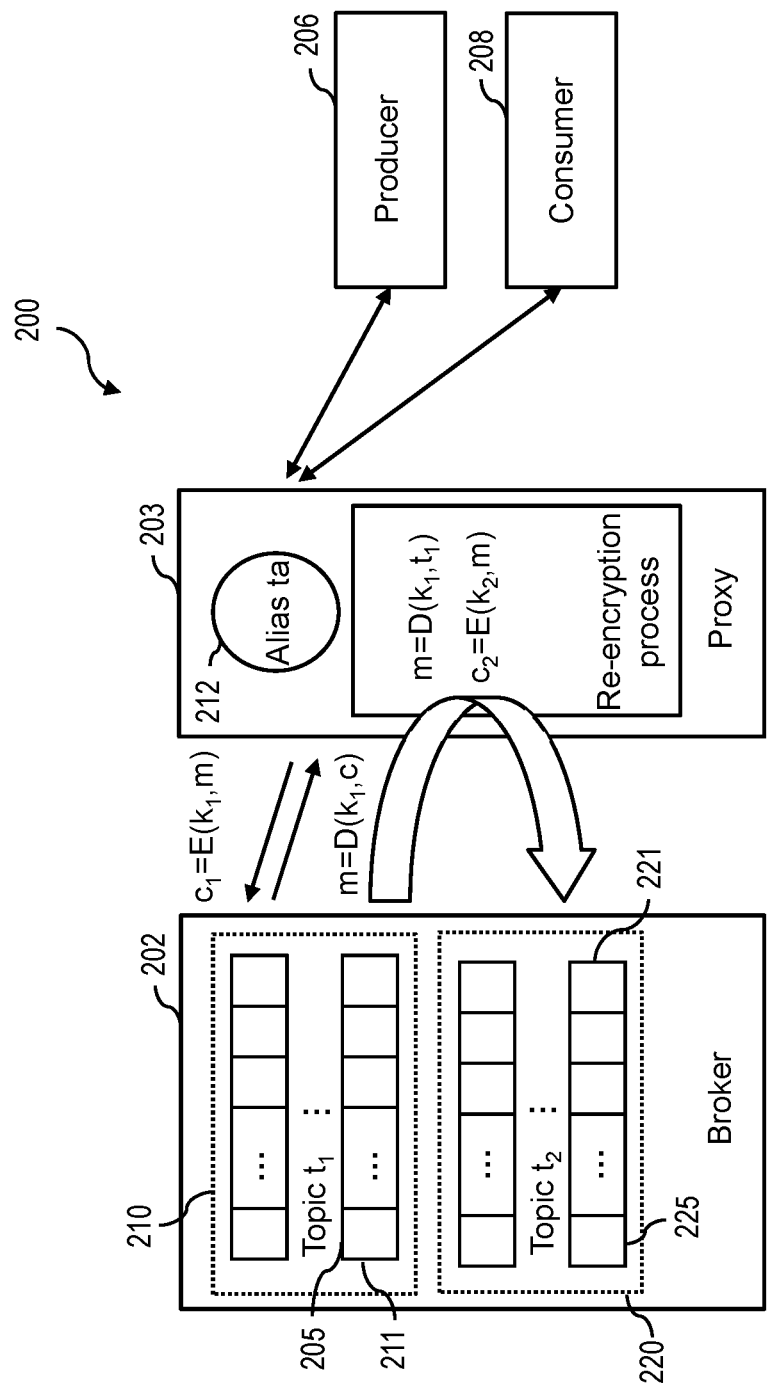
FIG. 12 depicts a schematic diagram illustrating an exemplary publish-subscribe system with a topic alias implemented in a proxy.
Figure 13:
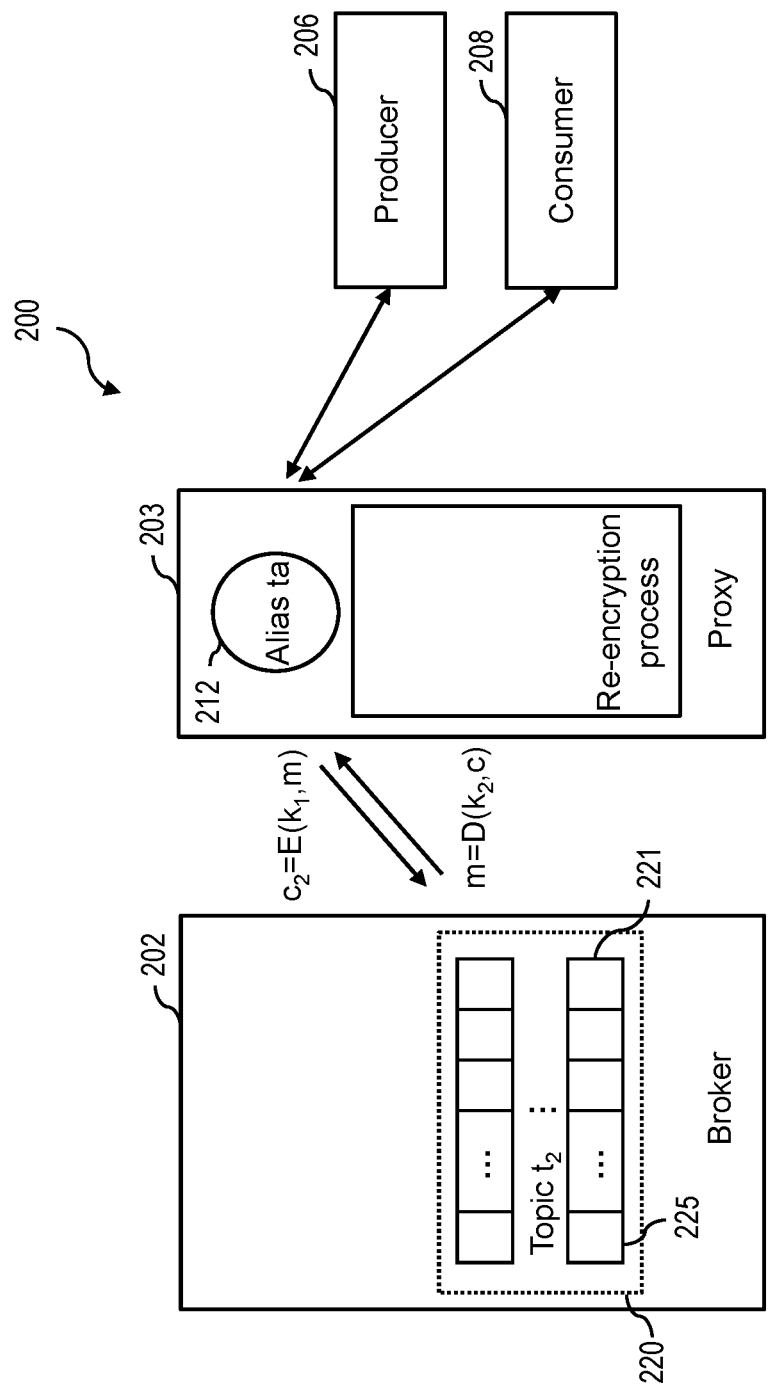
FIG. 13 depicts a schematic diagram illustrating an exemplary publish-subscribe system with a topic alias implemented in a proxy.

FIG. 11, FIG. 12, and FIG. 13 show alternative embodiments of FIG. 7, FIG. 8, and FIG. 10, respectively, in which the topic alias ta 212 and the re-encryption process 214 are implemented in a proxy 203 instead of broker 202.

Figure 14:
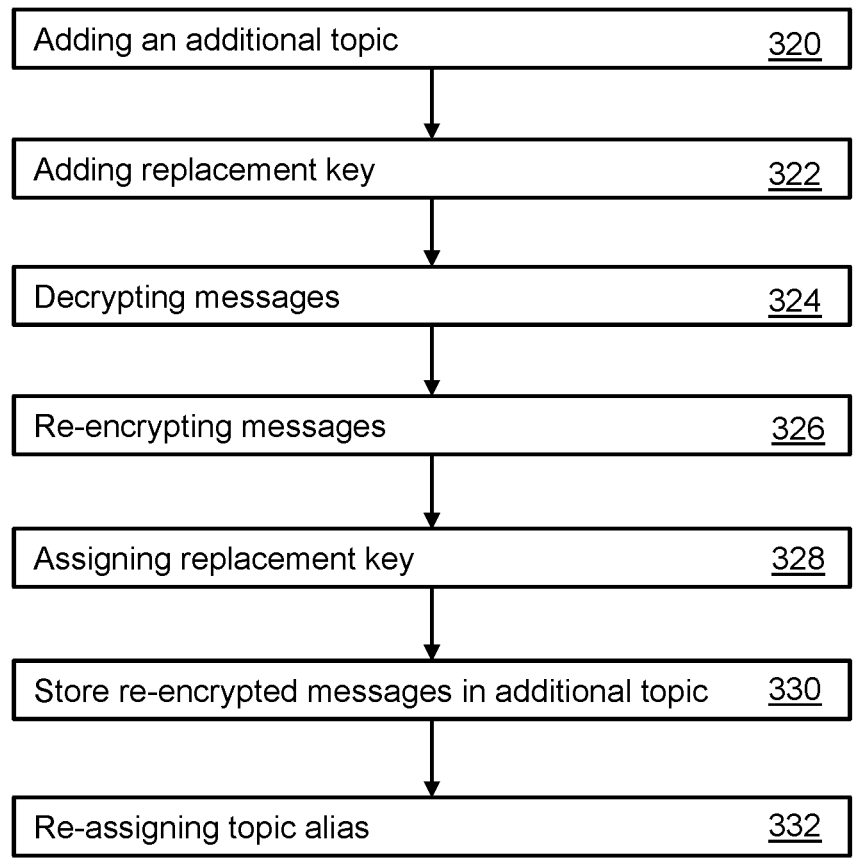
FIG. 14 depicts a schematic flow diagram of an exemplary method for a cryptographic key rotation.

FIG. 14 shows a schematic flow diagram of an exemplary method for a cryptographic key rotation in a publish-subscribe system, like the publish-subscribe system 200 of FIG. 7 to FIG. 13. The method of FIG. 14 corresponds to the method of FIG. 6 and is adjusted to use a topic alias for the cryptographic key rotation. The topic alias points to the first topic from the first messages. Subscribers of the common first topic subscribe to the first topic alias. Furthermore, publisher, i.e., producer, sending may messages may assign the messages to the first topic alias. Messages assigned to the first topic alias may automatically be re-assigned to the common first topic.

In block 320, an additional common second topic may be added. Blocks 322 to 328 may correspond to blocks 300 to 306 of FIG. 6. In block 330, the re-encrypted messages are stored in message log of the additional common second topic added in block 320. In block 332, the publish-subscribe system may switch from using the encrypted first messages and the assigned first cryptographic keys for the routing to using the re-encrypted first messages and the assigned replacement keys. The switching may comprise re-assigning the topic alias from the common first topic comprising the encrypted first messages to the common second topic comprising the re-encrypted first messages. In addition, the previously used encrypted first messages and/ or the previously used first cryptographic keys may be deleted. The deletion may, e.g., comprise a deletion of the common first topic.

Figure 15:
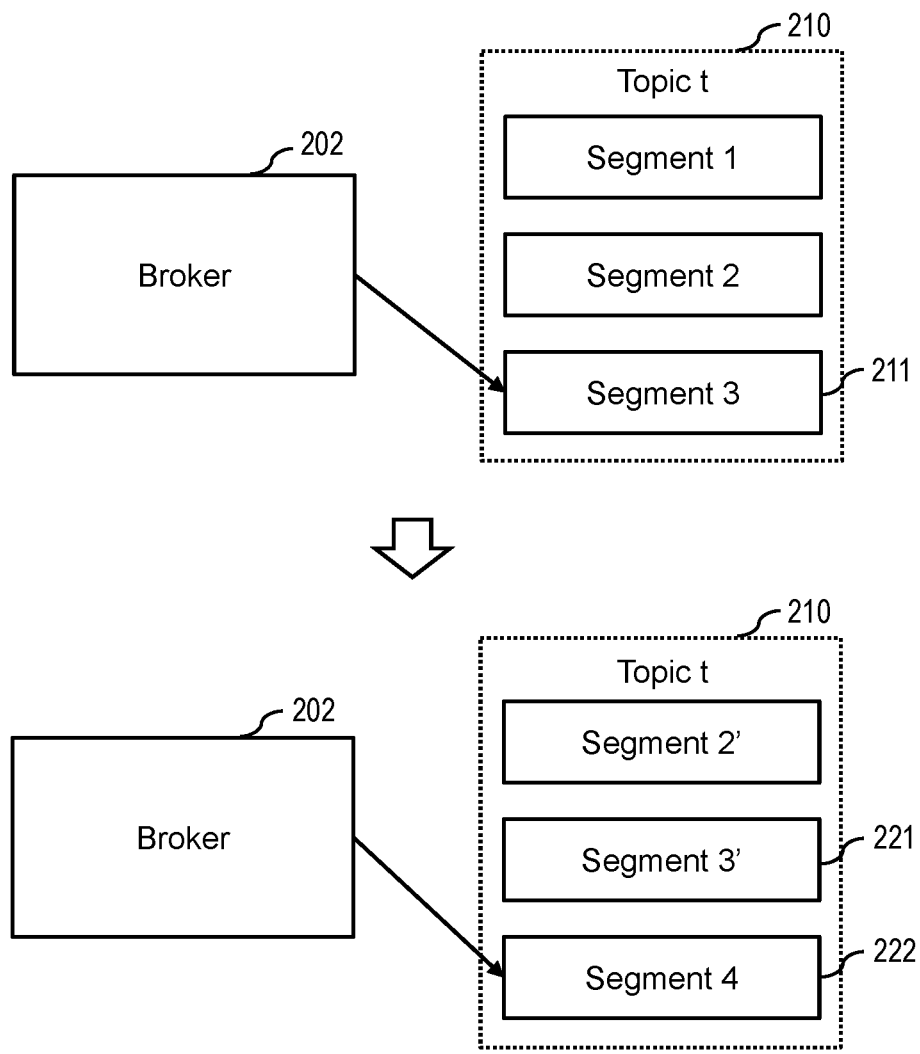
FIG. 15 depicts a schematic diagram illustrating an implementation of a re-encryption using a broker re-encryption service.

FIG. 15 shows a schematic block diagram illustrating an alternative implementation of a re-encryption using a broker re-encryption service. The broker re-encryption service may be implemented in a broker 202 as shown in FIG. 4. The broker re-encryption service may involve no topic aliases, but rather extend the topic management, e.g., of topic t 210, within the broker 202. For example, a log cleaner service of the broker performing compaction and handling expiration via background threads may be extended to include re-encryption features in order to provide the re-encryption service.

A topic t 210 may consist of a plurality of partitions which each consist of a plurality of segment files 211. A write process for adding an additional message, i.e. a new message, to the topic t 210 may comprise appending the additional message to the last open segment file 211, e.g., segment file "Segment 3". Closed segment files may only be swapped or deleted by a log cleaner service, e.g., when a maximum retention time of the messages stored in the respective segment files expires.

A re-encryption workflow with a broker re-encryption service may comprise issuing a command to re-encrypt an existing topic encrypted with a first cryptographic key with a second, i.e., a new, cryptographic key. In responds to the issuing of the command, the re-encryption process may be started. The re-encryption process may be implemented as background threads. New incoming messages may be encrypted using the second key. The broker 202 may close the current segment file "Segment 3" and open a new segment file 222 "Segment 4". The broker 202 may further determine and store an offset value of an offset of a message with which the encryption using the second key is started.

A re-encryption of previously received messages, i.e. messages stored in the closed segments files 211 "Segment 1", Segment 2", and "Segment 3", may be initiated by background threads. All previous messages starting with the determined offset, i.e., all messages encrypted with the previous cryptographic key, may be re-encrypted, e.g., on a file by file basis. For example, the re-encryption may begin with the latest segment file 211 "Segment 3". Once a segment file 211 "Segment 3" is re-encrypted, i.e., decrypted using the previous first cryptographic key and encrypted using the current second cryptographic key, the resulting re-encrypted segment file 221 "Segment 3'" is swapped with the previous segment file 211 "Segment 3". For example, the previous segment files 211 "Segment 2" and "Segment 3" comprising messages encrypted using the previous cryptographic key may be replaced by the re-encrypted segment files 221 "Segment 2'" and "Segment 3'" comprising the same messages as the previous segment files 211 "Segment 2" and "Segment 3", which have been re-encrypted using the current second cryptographic key. Once the last message of the last segment file 211, e.g., the oldest segment file "Segment 2", is re-encrypted, the re-encryption process may be finished and the previous first cryptographic key, i.e., may be discarded. For example, a segment file "Segment 1" may be deleted during the key rotation, due an expiring of a maximum retention time for the messages comprised by the respective segment file "Segment 1". Thus, starting the re-encryption with the latest "Segment 3" may prevent the public-subscribe system from unnecessarily re-encrypting a segment file, like "Segment 1", which is deleted later on during the key rotation.

The re-encryption using a re-encryption service on a broker 202 as illustrated in FIG. 15 may be optimized implementing a parallelization. The re-encryption workload may be parallelized, i.e., distributed over a plurality of broker of a cluster of brokers comprised by the publish-subscribe system. Examples may have the beneficial effect of increasing, e.g., optimizing, the re-encryption speed. The publish-subscribe system may comprise a plurality of brokers. An internal protocol of the publish-subscribe system may be adjusted such that all brokers of the publish-subscribe system with a replica of a partition may coordinate amongst themselves such that each re-encrypts only some subset of the segment fields of the respective partition. Each of the brokers then exchanges the subset of re-encrypted segment fields with all other brokers having the replica as well.

Figure 16:
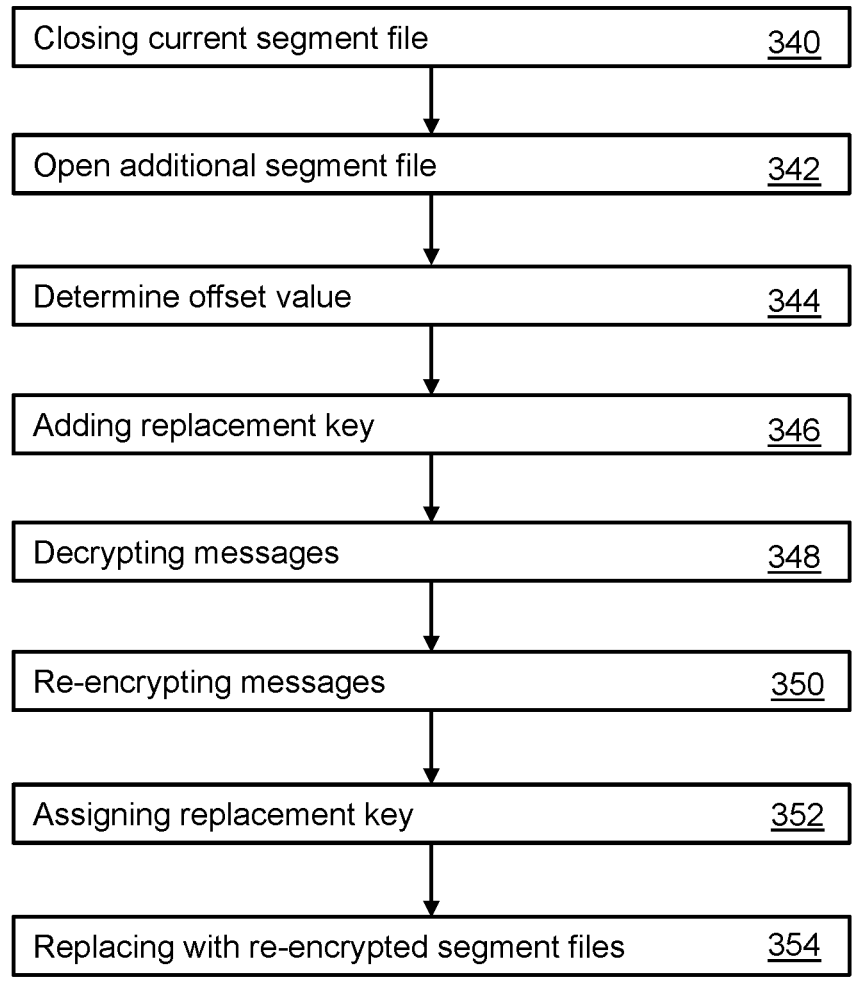
FIG. 16 depicts a schematic flow diagram of an exemplary method for a cryptographic key rotation.

FIG. 16 shows a schematic flow diagram of an exemplary method for a cryptographic key rotation in a publish-subscribe system, like the publish-subscribe system 200 of FIG. 7 to FIG. 13. The method of FIG. 16 corresponds to the method of FIG. 6 and is adjusted to use re-encryption service provided by a broker of the publish-subscribe system. Segment files may be used to store messages. If a segment file is full, the storing is continued with using a subsequent segment file.

In block 340, a segment file currently used for storing messages is closed and in block 342 an additional segment file is opened for storing messages. The messages stored in the additional segment file are encrypted using replacement keys provided in block 346. For example, the replacement keys may be provided before any of blocks 340, 342, or 344. In block 344 an offset value identifying an offset at which a storing of messages encrypted with the replacement keys is started may be determined and, e.g., stored. Blocks 346 to 352 may correspond to blocks 300 to 306 of FIG. 6. The re-encryption of the messages of the segment files may result in re-encrypted segment files. In block 354 the segment files stored may are replaced by the re-encrypted segment files. For example, the re-encryption may be started with the latest segment file stored and may be finished upon reaching and re-encrypting the oldest remaining segment file stored.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows.

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows.

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows.

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 17:
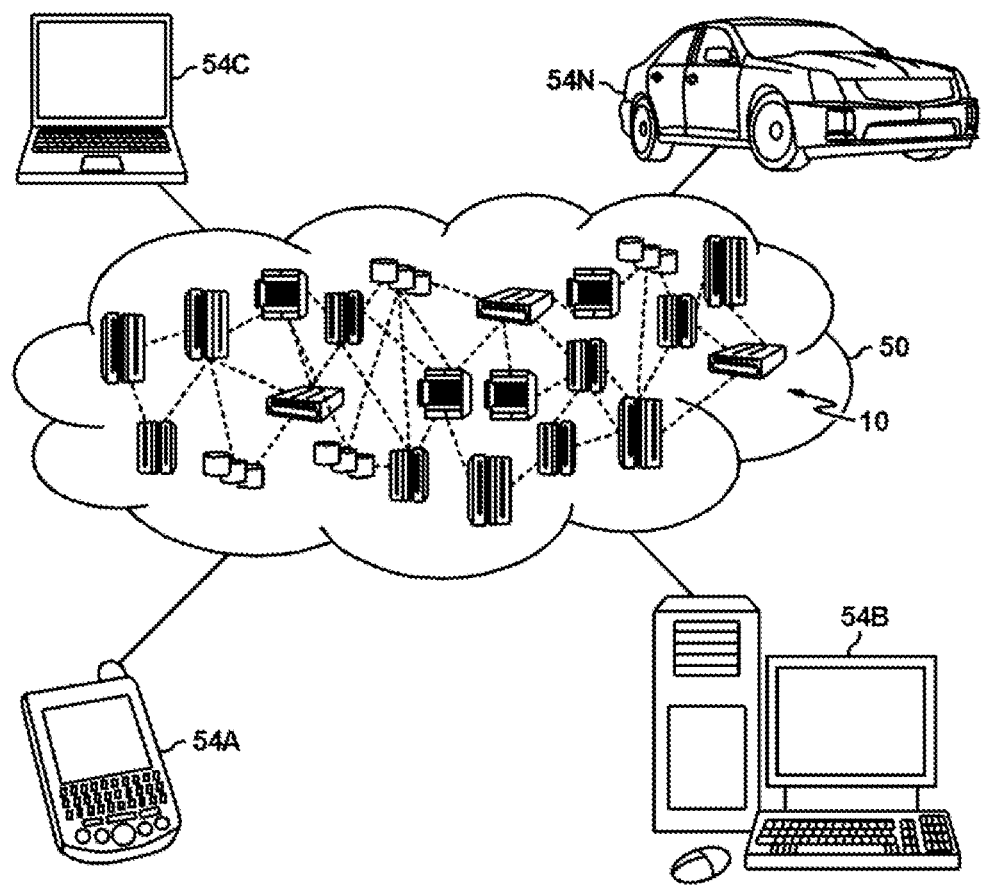
FIG. 17 depicts a schematic diagram illustrating a cloud computer environment.

Referring now to FIG. 17, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 18:
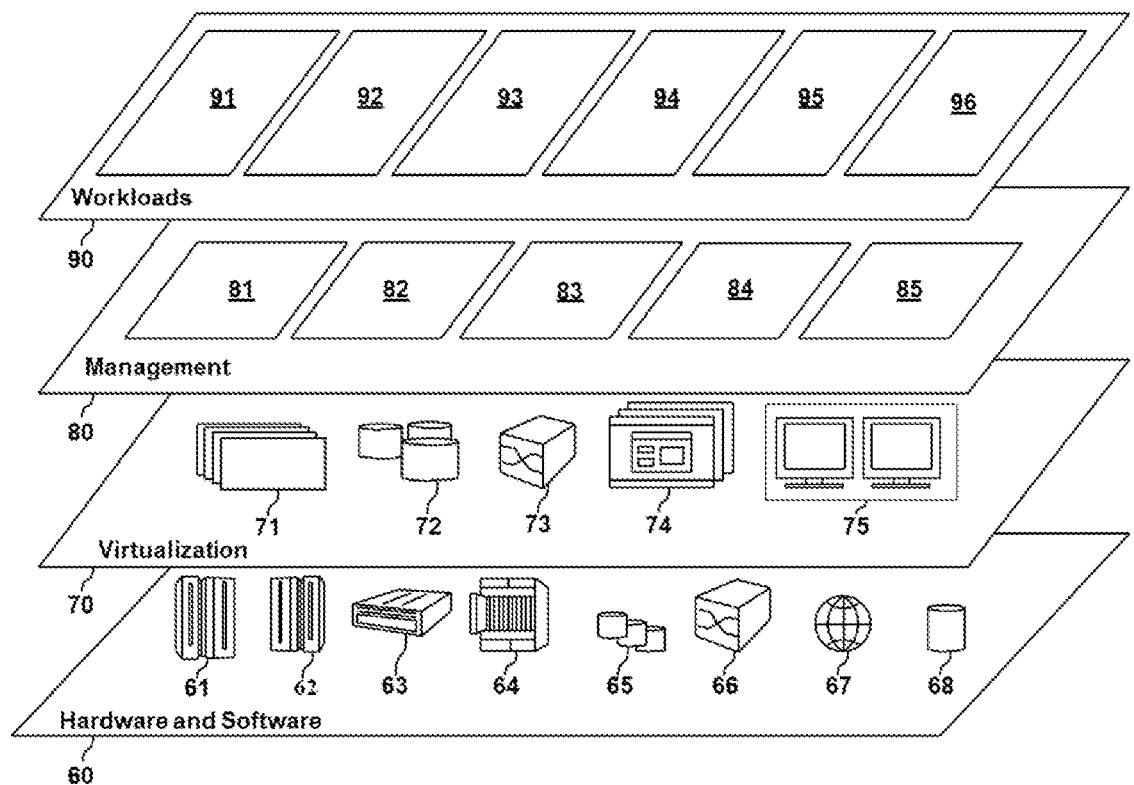
FIG. 18 depicts a block diagram illustrating a set of functional abstraction model layers provided by the cloud computing environment.

Referring now to FIG. 18, a set of functional abstraction layers provided by cloud computing environment 50 (FIG. 17) is shown. It should be understood in advance that the components, layers, and functions shown in FIG. 18 are intended to be illustrative only and embodiments of the disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and cryptographic key rotation in a publish-subscribe system 96.

What is claimed is:

1. A method for a cryptographic key rotation in a publish-subscribe system, comprising:
    storing, by the publish-subscribe system, a plurality of messages, where the stored messages are assigned to a topic from a group of topics and the stored messages are encrypted with a first cryptographic key of a group of one or more cryptographic keys assigned to the respective stored messages;
    routing, by the publish-subscribe system, the stored messages to one or more subscribers of the topics to which the stored messages are assigned,
    the routing comprising:
        decrypting a message in the plurality of messages to be routed using an assigned cryptographic key of the respective message; and
        sending the message to one or more of the subscribers that are subscribed to a topic assigned to the message; and
    performing, by the publish-subscribe system, the cryptographic key rotation comprising a re-encryption of one or more first messages of the stored messages,
    the re-encryption comprising:
        assigning the one or more first messages to a common first topic from the group of topics;
        adding a second cryptographic key to the group of one or more cryptographic keys, the second cryptographic key being a replacement key for the first cryptographic key;
        decrypting the one or more first messages using the first cryptographic key assigned to the one or more first messages;
        re-encrypting the one or more first messages using the second cryptographic key, forming one or more re-encrypted first messages;
        assigning the second cryptographic key to the one or more re-encrypted first messages; and
        switching from using the one or more first messages and the first cryptographic key for the routing to using the one or more re-encrypted first messages and the second cryptographic key for the routing.

2. The method of claim 1, wherein the re-encryption is executed as a background process, while continuing the routing of the one or more first messages and receiving additional first messages for the common first topic.

3. The method of claim 2, wherein a broker of the publish-subscribe system communicates with clients of the publish-subscribe system via a proxy of the publish-subscribe system.

4. The method of claim 1, wherein the stored messages are provided with a header identifying an assigned cryptographic key, and the header identifying the assigned cryptographic key is removed during the routing prior to sending the stored messages to the one or more subscribers.

5. The method of claim 4, wherein:
    the decrypting of the one or more first messages further comprises decrypting the first cryptographic key provided by the header of a respective first message using an envelope encryption key; and
    the re-encryption further comprises encrypting the second cryptographic key with the envelope encryption key and replacing the first cryptographic key in the header of the respective first message with the encrypted replacement key.

6. The method of claim 1, wherein the publish-subscribe system comprises an index identifying for each of the stored messages an assigned cryptographic key of the group of one or more cryptographic keys.

7. The method of claim 6, wherein the re-encryption further comprises for each of the one or more first messages:
    identifying the first cryptographic key assigned to a respective first message using the index; and
    assigning in the index the second cryptographic key for the identified first cryptographic key to a re-encrypted first message corresponding to the respective first message.

8. The method of claim 1, each of the stored messages being stored as a member of a topic to which a respective message is assigned, the method further comprising:
    providing a first topic alias pointing to the common first topic, the one or more subscribers of the common first topic subscribing to the first topic alias;
    adding an additional common second topic to the group of topics; and
    storing the one or more re-encrypted first messages as members of the common second topic, wherein the switching comprises re-assigning the first topic alias to the common second topic such that the one or more subscribers that subscribe to the first topic alias become subscribers of the common second topic.

9. The method of claim 8, wherein the switching further comprises deleting the common first topic with the one or more first messages.

10. The method of claim 8, wherein the switching further comprises deleting the first cryptographic key.

11. The method of claim 8, wherein additional first messages received by the publish-subscribe system from a publisher for the first topic alias each are:
- assigned to the common second topic;
- assigned with the second cryptographic key; and
- encrypted using the second cryptographic key.

12. The method of claim 1, wherein the switching further comprises replacing each of the one or more first messages with corresponding re-encrypted first messages.

13. The method of claim 12, wherein:
- the one or more first messages are stored in a set of segment files;
- one of the segment files of the set of segment files being currently used for storing encrypted first messages, while the remaining segment files of the set of segment files already filled with encrypted first messages are closed, wherein, if an open segment file is full, the open segment file is closed, an additional segment file is added to the set of segment files, and the additional segment file is used for storing encrypted first messages;
- upon starting the re-encryption, the segment file currently used for storing encrypted first messages is closed and a further additional segment file is added to the set of segment files and used for storing additional encrypted first messages received by the publish-subscribe system from publishers for the common first topic; and
- the re-encryption of the one or more first messages is performed segmentally, the segmental re-encryption comprises:
  - selecting remaining closed segment files one after another;
  - generating for each of the remaining closed segment files a replacement segment file comprising first messages in encrypted form obtained from a respective remaining closed segment file; and
  - replacing the respective remaining closed segment file with the replacement segment file.

14. The method of claim 13, wherein the segmental re-encryption is started with a latest segment file of a set of segments files.

15. The method of claim 13, wherein an offset value is determined identifying an offset of an additional first message with which the encryption using the second cryptographic key is started within a storage of the publish-subscribe system.

16. The method of claim 13, wherein additional first messages received by the publish-subscribe system from the publishers for the common first topic each are:
- assigned to the common first topic;
- assigned with the second cryptographic key; and
- encrypted using the second cryptographic key.

17. The method of claim 13, wherein the publish-subscribe system comprises a plurality of additional brokers, wherein:
- the publish-subscribe system comprises a plurality of additional replicas of a set of segments files, each of the additional replicas is assigned to one of the additional brokers; and
- the re-encryption of the segment files is distributed between the brokers of the publish-subscribe system implementing a parallelization of the re-encryption, re-encrypted first messages are distributed to the other replicas of the set of segment files.

18. A computer program product for a cryptographic key rotation in a publish-subscribe system, the computer program product comprising a computer readable storage medium having program instructions embodied therewith, the program instructions executable by a processor of a computer system of a publish-subscribe system to cause the computer system to:
- store a plurality of messages, wherein the stored messages are assigned to a topic from a group of topics and the stored messages are encrypted with a first cryptographic key of a group of one or more cryptographic keys assigned to the respective stored messages;
- route the stored messages to one or more subscribers of the topics to which the stored messages are assigned, the routing comprising:
  - decrypting a message in the plurality of messages to be routed using an assigned cryptographic key of the respective message: and
  - sending the message to one or more of the subscribers that are subscribed to a topic assigned to the message; and
- perform the cryptographic key rotation comprising a re-encryption of one or more first messages of the stored messages,
the re-encryption comprising:
- assigning the one or more first messages to a common first topic from the group of topics;
- adding a second cryptographic key to the group of one or more cryptographic keys, the second cryptographic key being a replacement key for the first cryptographic key;
- decrypting the one or more first messages using the first cryptographic key assigned to the one or more first messages;
- re-encrypting the one or more first messages using the second cryptographic key, forming one or more re-encrypted first messages;
- assigning the second cryptographic key to the one or more re-encrypted first messages; and
- switching from using the one or more first messages and the first cryptographic key for the routing to using the one or more re-encrypted first messages and the second cryptographic key for the routing.

19. A computer system for a cryptographic key rotation in a publish-subscribe system, comprising:
- one or more computer readable storage media storing program instructions and one or more processors which, in response to executing the program instructions, are configured to:
  - store, by the publish-subscribe system, a plurality of messages, wherein the stored messages are assigned to a topic from a group of topics and the stored messages are encrypted with a first cryptographic key of a group of one or more cryptographic keys assigned to the respective stored messages;
  - route, by the publish-subscribe system, the stored messages to one or more subscribers of the topics to which the stored messages are assigned, the routing comprising;
    - decrypting a message in the plurality of messages to be routed using an assigned cryptographic key of the respective message; and
    - sending the message to one or more of the subscribers that are subscribed to a topic assigned to the message; and
  - perform, by the publish-subscribe system, the cryptographic key rotation comprising a re-encryption of one or more first messages of the stored messages,
  the re-encryption comprising:
  - assigning the one or more first messages to a common first topic from the group of topics;

adding a second cryptographic key to the group of one or more cryptographic keys, the second cryptographic key being a replacement key for the first cryptographic key;

decrypting the one or more first messages using the first cryptographic key assigned to the one or more first messages;

re-encrypting the one or more first messages using the second cryptographic key, forming one or more re-encrypted first messages;

assigning the second cryptographic key to the one or more re-encrypted first messages; and switching from using the one or more first messages and the first cryptographic key for the routing to using the one or more re-encrypted first messages and the second cryptographic key for the routing.

* * * * *